United States Patent [19]
Wilson

[11] Patent Number: 5,260,883
[45] Date of Patent: Nov. 9, 1993

[54] INTERACTIVE DATA ENTRY SYSTEM AND METHOD FOR THE DESIGN, ENGINEERING AND MANUFACTURE OF METER TUBES

[75] Inventor: Buford B. Wilson, Houston, Tex.

[73] Assignee: Daniel Flow Products, Inc., Houston, Tex.

[21] Appl. No.: 816,578

[22] Filed: Jan. 3, 1992

Related U.S. Application Data

[63] Continuation of Ser. No. 701,573, May 14, 1991, abandoned, which is a continuation of Ser. No. 222,210, Jul. 21, 1988, abandoned.

[51] Int. Cl.$^5$ .............................................. G06F 15/20
[52] U.S. Cl. .................... 364/512; 395/600; 395/919
[58] Field of Search ............ 364/550, 551.01; 395/50, 54, 904, 919, 600

[56] References Cited

U.S. PATENT DOCUMENTS

| | | | |
|---|---|---|---|
| 4,318,184 | 3/1982 | Millett et al. | 364/900 |
| 4,591,983 | 5/1986 | Bennett et al. | 364/403 |
| 4,628,434 | 12/1986 | Tashiro et al. | 364/130 |
| 4,648,044 | 3/1987 | Hardy et al. | 364/513 |
| 4,700,317 | 10/1987 | Watanabe et al. | 364/488 |
| 4,740,886 | 4/1988 | Tanifuji et al. | 364/150 |
| 4,763,277 | 8/1988 | Ashford et al. | 364/513 |

OTHER PUBLICATIONS

Roth, "The Knowledge-Based Expert System: A Tutorial," Sep. 1984, IEEE Computer, pp. 11–28.
Michaelsen, "The Technology of Expert Systems," Apr. 1985, Byte, pp. 303–312.
Hartzband, "Enhancing Knowledge Representation in Engineering Databases," Sep. 1985, IEEE Computer, pp. 39–48.
Martin et al, "Building Expert Systems," 1988 pp. 223–226 and 109.

*Primary Examiner*—Thomas G. Black
*Attorney, Agent, or Firm*—Alton W. Payne

[57] ABSTRACT

The interactive data entry system and method of the present invention automatically assists in the design, engineering and fabrication of a pipe line flow measurement system in accordance with the relevant standards, regulations and industry requirements. Given site-specific criteria for a meter tube, the present invention provides a user interface to assist with calculation of the optimal design criteria, selection the specific parts required to implement the optimal design and displays with a drawing the final design results and developing a bill of material therefore.

1 Claim, 8 Drawing Sheets

| ITEM | QTY/UM | DESCRIPTION | PART no. |
|---|---|---|---|
| 1 | 1 EA | SENIOR RAISED FACE FLANGNEK | 202-19-031 |
| 2 | 64.1250 IN | UPSTREAM CUT LENGTH PIPE DOMESTIC | 603-02-719 |
| 3 | 15.0625 IN | DOWNSTREAM CUT LENGTH PIPE DOMESTIC | 603-02-719 |
| 4 | 1 EA | LINE TYPE STRAIGHTENING VANE | 214-03-025 |
| 5 | 2 EA | RAISED FACE WELDNECK FLANGE | 321-02-500 |
| 6 | 1 EA | COMPANION FLANGE KIT | 012-13-080 |

VANE CPLG DIM FROM NEAREST D/S FLG FACE (EXCEPT: USE PLATE CL FOR WN FTG)
      1/2 3000 THD 3 - 8 BONNEY        48.3198/0 DEG 507-04-082

U/S CPLGS DIM FROM U/S OUTER END        LOCATION
CPLG1    1/2 3000 THD 3 - 8 BONNEY        10.2500 0.DEG 507-04-082
D/S CPLGS DIM FROM D/S OUTER END        LOCATION
CPLG1    P3-8 3000#1/2"SCKLT        10.2500 0.DEG

DANIEL
Houston, Texas 77224

PART   4" 4.026 BORE SCH 40 600# STANDARD TRIM AGA FIG 5 .65 BETA
SENIOR: RAISED FACE FLANGNEK METER TUBE

| DRN | CHK | APPVD | CUST DWG/SPEC REF |
|---|---|---|---|
| DATE | PART no. | DWG no. | REV |

FIG. 7

INTERACTIVE DATA ENTRY SYSTEM AND METHOD FOR THE DESIGN, ENGINEERING AND MANUFACTURE OF METER TUBES

This is a continuation of copending application Ser. No. 07/701,573 filed on May 14, 1991 and now abandoned. Ser. No. 07/701,573 in a continuation of Ser. No. 07/222,210, filed Jul. 21, 1988 and now abandoned.

FIELD OF THE INVENTION

The present invention relates generally to the utilization of computerized systems and methods for designing, engineering and manufacturing. More particularly, the present invention pertains to an interactive data entry system and method for the design, engineering and manufacture of meter tubes.

BACKGROUND OF THE INVENTION

The accurate measurement of natural gas and other fluids is of critical concern. The measurement of natural gas and other fluids is required with the production, processing, transportation and distribution of natural gas and fluid products from exploration to utilization. The accurate measurement of fluids having a substantial monetary value, for example, natural gas, natural gas liquids, hydrocarbon gases, hydrocarbon liquids, and the like, is essential to the efficient use of the fluids and controlled cost accounting. Specifically, the accurate measurement of fluids is essential for determining accountable custody transfer determinations.

Information storage and retrieval systems are available for utilization and implementation in the invention of the present interactive data entry system and method. For example, U.S. Pat. No. 4,318,184 entitled "Information Storage and Retrieval System and Method" to Millett, et al., issued Mar. 2, 1982, provides a form of hierarchal information groups which is readily usable in the interactive data entry system and method of the present invention. U.S. Pat. No. 4,318,184 is incorporated by reference for all purposes herein.

To accurately measure quantities of valuable fluids, the calculation of flow rate in either mass or volume units is required. It is common practice in the trade to use a meter tube to determine, as accurately as possible, the flow rate in mass or volume units. In its simplest form, a meter tube has a specific inside diameter, a plate holding device such as an orifice fitting or orifice flanges, the straight upstream pipe of equal diameter, and a similar downstream pipe beyond the orifice. The orifice meter utilized within conventional meter tubes is a volumetric meter. The orifice plate creates a differential pressure. The differential pressure created by the orifice meter is developed as a function of the acceleration of the fluid as it passes through the aperture in the plate. The differential pressure measurement in conjunction with density measurement permits a calculation of the flow rate in either mass or volume units. The industrial community employs several units of measurement for flow rate and the many supporting variables. Information concerning the units of measurement for flow rate and the associated variables can be found in A.G.A. Report No. 3-ANSI/API 2530 (1985) by the American Gas Association, 1515 Wilson Boulevard, Arlington, Va. 22209, entitled "Orifice Metering of Natural Gas and Other Related Hydrocarbon Fluids." Also, similar information can be found in Flow Measurement Engineering Handbook, by R. W. Miller, published in 1983 by the McGraw-Hill Book Company. In principle, the orifice meter is essentially a mass flow meter based upon the concepts of conservation of mass and conservation of energy. Even with accurate construction and calculation, no two meter tubes give exactly the same readings when the same amount of gas is flowing.

Uncertainties are unavoidable and are caused by the differences between ostensibly duplicate meters. Thus, uncertainty limits are specified in regulations. Section 7, A.G.A. Report No. 3-ANSI/API 2530 (1985). It can be readily appreciated that even when the same amount of fluid is flowing, no two orifice meters can be built to give exactly the same readings. Thus, uncertainties are inherent in any calculation of mass flow rate or volume flow rate. For commercial evaluations, the uncertainties must include some allowance for the pressure and temperature measuring devices as well as allowances for the orifice plate. Thus, the commercial accuracy will be less than the accuracy indicated by the tolerance given for the specific orifice meter. Similarly, the exact duplication of orifice meters and orifice plates is not commercially possible. Two duplicate plates made, installed, and operated as nearly as practicable, in accordance with industry standards and specifications, cannot be expected to have exactly the same readings regardless of how many times or how accurately the two meters are tested. These uncertainties are associated with the practically unavoidable individual differences between ostensibly duplicate plates. The uncertainties do not refer to accidental errors of observation, concerning which no general predictions are possible.

As can be appreciated in the art, several forms of flow equations can be utilized in the design of meter tubes. The choice of any particular flow equation remains with the user and the designer. The particular choice of specific flow equations is mandated, by industry criteria as well as by contractual requirements established by practices and traditions with respect to custody transfer, to be made on the basis of a preferred structure and the measurement data available or required for the specific calculation. Thus, a broad spectrum of design, engineering and manufacturing criteria may be applicable for each particular meter tube used in a site specific situation.

The primary consideration in the design of a metering station is sustained accuracy. Many particulars must be considered and evaluated prior to the ultimate design of a meter tube. The manufacture of the meter tube requires detailed specifications and drawings. In addition to the flow characteristics, the meter tube must be designed for ease of maintenance, repair and service in the piping system to provide accuracy, accessibility, safety and work space for operation. Typically, the desired features of the meter tube are combined into a piping structure with an adequate foundation and a partial or complete shelter arranged to fit the particular sight. Further, the station is designed to require a minimum of piping alterations since the capacity requirements of the particular station may change.

There exists basic physical parameters and industry restraints that must be considered in the design, manufacture and use of meter tubes. Important design factors to be considered are choosing the meter tube size and orifice size necessary for the flow volume, selecting proper materials for the operating pressures involved, selecting the correct length of the meter tube to meet industry and/or code standards and recommendations, and the careful inspection of tubes to ascertain that they meet the standards and recommendations.

Determining the accurate size of a meter tube and the associated orifice for a specific application is critical. The size of a meter tube and orifice can be determined from data published by the American Gas Association, the American Society of Mechanical Engineers and from other fluid meter handbooks. The $\beta$-ratio is a critical factor for determining the correct meter tube and associated orifice. The $\beta$-ratio is defined as the orifice-to-pipe diameter ratio. Typically to obtain the highest flow accuracy, the $\beta$-ratio should be limited to a minimum of 0.15 and a maximum of 0.70 for flange taps. Within the range of $\beta$-ratios of 0.15 to 0.70, the accuracy of the coefficient is approximately 0.5%. Within the $\beta$-ratio ranges of 0.10 to 0.15 and from 0.70 to 0.75, the accuracy of the coefficient is approximately 1%. The $\beta$-ratio constrains the selection of pipe size. The minimum length of meter tube required varies with the $\beta$-ratio. The higher the $\beta$-ratio the longer the requirement for the length of the meter tube. Meter tube lengths are guided by industry restraints and the practical experience of the designing engineer. Industry restraints are particularly used in the following situations: (1) two bends or elbows, not in the same plane, precede the meter tube; (2) two bends or elbows, in the same plane, precede the meter tube; (3) a partially closed gate or plug valve precedes the meter tube; (4) a concentric reducer precedes the meter tube.

Also, the use of straightening vanes may be required. In determining whether or not straightening vanes are required, each individual meter tube design may have a different set of conditions. For example, the governing factor may not always be the nearest fitting on the inlet end of the meter tube. Therefore, it has been impractical to set up specifications that would suit all conditions. The primary consideration with respect to straightening vanes is the consideration to minimize flow disturbance at the orifice plate from any upstream fitting or fittings.

Further, the maximum allowable working pressures for complete meter tube assemblies is dependent on the maximum allowable working pressures of the pipe, the flanges, the orifice fitting and the valves that make up the assembly.

In designing a typical meter tube system, numerous components must be evaluated and selected according to the sight specific criteria where the meter tube will be used. For example, typical criteria required to be evaluated in the design, engineering and manufacture of a meter tube are: (1) type of fitting, (2) the branch size, (3) the pressure, (4) the bore, (5) the style of fitting connections, (6) the trim, (7) the type of pipe, (8) the end connections, (9) the $\beta$-ratio, (10) the applicable A.G.A. FIGS. 4 through 8, (11) the type of straightening vane, (12) the A.G.A. minimum calculations and (13) the length of the meter tube. In evaluating these and related criteria, an interactive data entry in the area of meter tubes has been indispensable. Even the simplest structure may have restraints or criteria which would be out of the ordinary.

There is, thus a need for an interactive data entry system and method for assisting in the design, engineering and manufacture of meter tubes for minimizing the redesign of the meter tube characteristics in the design, the engineering and the manufacturing stages.

It is, therefore, a feature of the present invention to provide a unique interactive data entry system and method for assisting in the design, engineering and manufacture of meter tubes. It is a more particular feature of the present invention to provide an interactive data entry system and method for assisting in designing, engineering and manufacturing site specific meter tubes. The interactive data entry system and method utilizes a hierarchal information analysis in the evaluation of and the determination of the appropriate meter tube design.

Another feature of the present invention is to provide an interactive data entry system and method for assisting in the design, engineering and manufacture of meter tubes which can be used by a "lay person" having no expertise or prior knowledge concerning the technical information used in designing meter tubes other than the specification of the apparatus which is provided by the end user.

Yet another feature of the present invention is to provide an interactive data entry system and method for the design, engineering and manufacture of meter tubes to provide feasibility testing of customer orders and for identifying problems with customer specifications.

Yet still another feature of the present invention is to provide an interactive data entry system and method for the design, engineering and manufacture of meter tubes which guarantees that the meter tube designed can be manufactured according to general physical principles and industry standards.

Yet still another feature of the present invention is to provide an interactive data entry system and method for assisting in the design, engineering and manufacture of meter tubes which shortens the design time and thus improves the profitability of the meter tube.

A further feature of the present invention is to provide an interactive data entry system and method for assisting in the design, engineering and manufacture of meter tubes which reduces the plant inventory required based upon the design criteria of standard meter tubes.

Still further a feature of the present invention is to provide an interactive data entry system and method for assisting in the design, engineering and manufacture of meter tubes which improves customer service, shortens delivery time and increases productivity.

Yet still another feature of the present invention is to provide an interactive data entry system and method for the design, engineering and manufacture of meter tubes which utilizes the results of continuous functions for automatic and deterministic decision making.

Another feature of the present invention is to provide an interactive data entry system and method for assisting in the design, engineering and manufacture of meter tubes for converting customer specifications into manufacturing specifications including bills of material, drawings and the like. More particularly, a feature of the present invention is to improve the accuracy of the bills of material and the drawings.

Yet another feature of the present invention is to provide an interactive data entry system and method for assisting in the design, engineering and manufacture of meter tubes to convert batch operations to process operations. More particularly, it is a feature of the present invention to convert from the traditional batch operation technique of order entry, design, engineering and manufacturing to a more continuous, process operation such that a value can be added to the product with respect to the time saved.

Still another feature of the present invention is to provide an interactive data entry system and method for assisting in the design, engineering and manufacture of meter tubes for accepting customer inquiries or orders and predetermining a profit by avoiding the redesign of a customer order at each stage during the pre-production process by combining all pre-production operations into one.

Yet still another feature of the present invention is to provide an interactive data entry system and method for assisting in the design, engineering and manufacture of meter tubes utilizing personal computers such that productivity gains of as high as 72 to 1 can be obtained.

Yet still another feature of the present invention is to provide an interactive data entry system and method for assisting in the design, engineering and manufacture of meter tubes to avoid designs outside the manufacturing facility limitations.

A further feature of the present invention is to provide an interactive data entry system and method for assisting in the design, engineering and manufacture of meter tubes utilizing a modular or "phantom" bill of material to reduce the number of parts which must be coordinated thereby reducing the development and deployment time.

Yet still another feature of the present invention is to provide an interactive data entry system and method for the design, engineering and manufacture of meter tubes for providing a design tool and a cost estimating tool for providing accurate quotations to prospective clients.

Another feature of the present invention is to provide an interactive data entry system and method for assisting in the design, engineering and manufacture of meter tubes which is deterministic by acting as though the resultant design and associated characteristics are previously known.

Additional advantages and objects of the invention will be set forth in part in the description which follows, and in part will become apparent from the description, or may be learned by practice of the invention. The features and advantages of the invention may be realized and obtained by means of the instrumentalities, combinations and steps particularly pointed out in the appended claims.

SUMMARY OF THE INVENTION

To achieve the foregoing features and advantages and in accordance with the purposes of the invention as embodied and broadly described herein, an interactive data entry system is provided for assisting in designing, engineering and manufacturing meter tubes. The interactive data entry system of the present invention provides an interface for designing, engineering or implementing the fabrication of pipeline flow measurement systems in accordance with the American Gas Association Gas Measurement Report No. 3, related regulations, and the requirements set by Daniel Industries. Given a customer's specific requirements, the apparatus of the present invention assists in determining the best design criteria, selects the specific parts required to implement the calculated design criteria and displays with a drawing the final design results. The apparatus of the present invention generates a bill of material for the specific application as well as estimating the cost associated with the manufacture of the specific design. The apparatus of the present invention can achieve the design and engineering results within a short period of time utilizing a conventional personal computer, for example an IBM PC.

It is preferred to utilize an established product line in initiating the system and method of the present invention. Typically, only an established product line has sufficiently meaningful information upon which to base the interactive data entry system and method of the present invention.

BRIEF DESCRIPTION OF THE DRAWINGS

The accompanying drawings, which are incorporated into and constitute a part of the specification, illustrate a preferred embodiment of the invention and, together with the general description of the invention given above, and the detailed description of the preferred embodiment given below, serve to explain the principles of the invention.

FIG. 7 illustrates an example of the legend information which accompanies the plot provided by the interactive data entry system of the present invention.

Figure 1:
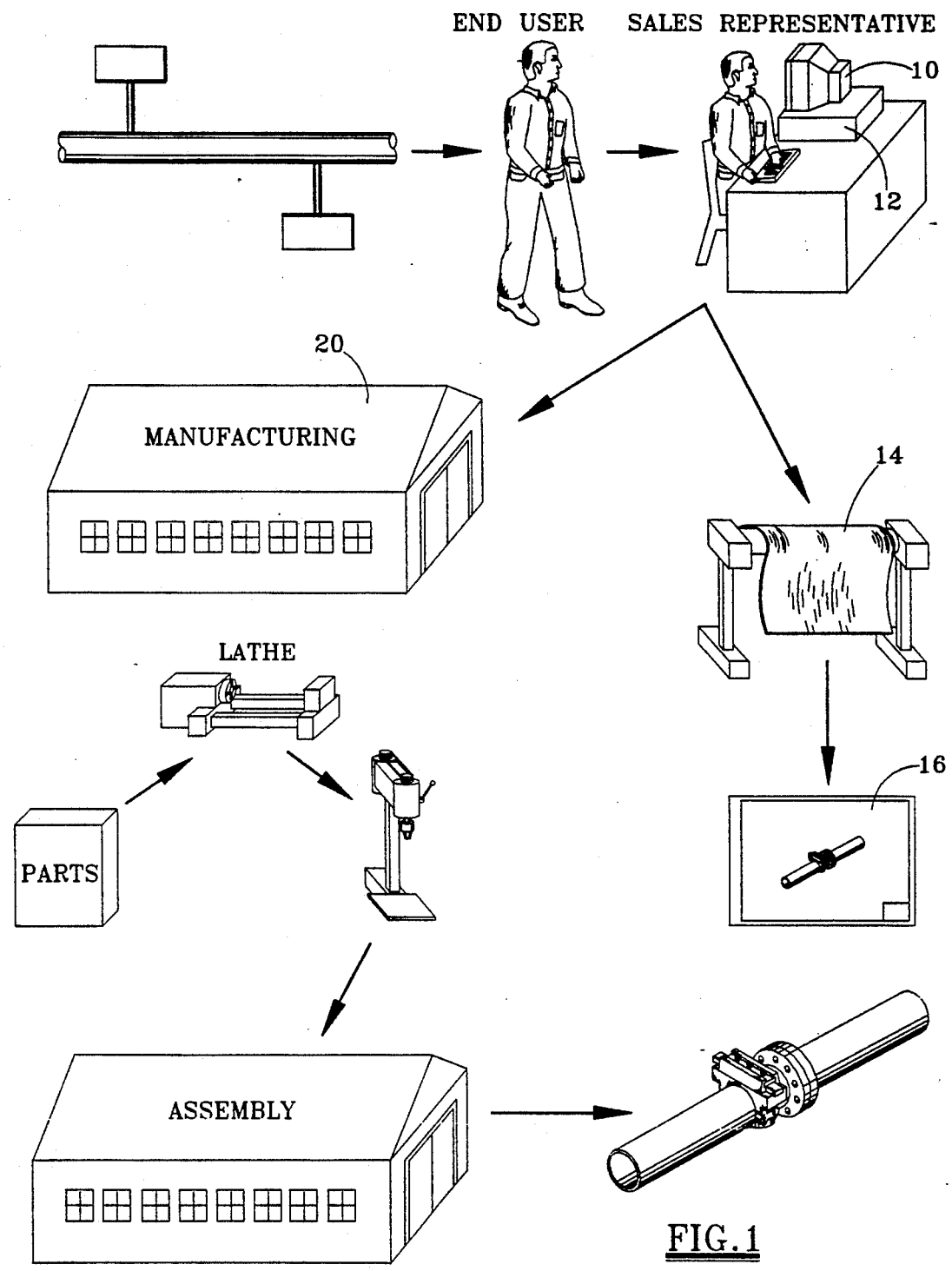
FIG. 1 is a schematic diagram illustrating the interactive data entry system of the present invention for assisting in the design, engineering and manufacture of meter tubes.

The above general description and the following detailed description are merely illustrative of the generic invention, and additional modes, advantages and particulars of this invention will be readily suggested to those skilled in the art by the following detailed description.

DETAILED DESCRIPTION OF THE PREFERRED EMBODIMENTS

Reference will now be made in detail to the present preferred embodiments of the invention as described in the accompanying drawings.

In implementing the interactive data entry system and method of the present invention, an adequate data base must be established with respect to standards, regulations and the acceptable practice in the art. Preferably, an established product line is utilized when developing the data base. An established product line is extremely helpful since there exits significant information upon which to base relevant decisions. In developing the system and method of the present invention, the data and information available with respect to meter tubes is acquired from part files, drawings files, and the literature. The product line information is input into a computer as a data base. Statistical analysis and evaluation is performed on the database. For example, the parts are placed in a matrix to determine the relationships between the various parts. These relationships are statistically analyzed. The relationships between the various parts included in the part files and the drawing files are critically analyzed to determine the relationships between each element of each file. Such analysis enables a determination of what parts are used, what is the frequency of use for each part, and what the different use and temporal relationships are between parts.

Typically, actual experts in the area of meter tube design, engineering and fabrication are interviewed. Also, the "working papers" of each interviewed meter tube expert are evaluated. The expert's own reasons for designing specific systems are evaluated and compared to the results of the data base analysis to determine individual "rules." In one embodiment of practicing the interactive data entry system of the present invention, a series of rules can be deciphered from the meter tube expert and confirmed or refuted by the results of the statistical analysis of the data base. The interview of the meter tube expert is to determine all of his/her empirical rules. The empirical rules are compared to the literature and the industry standards as well as the results of the data base analysis. Exceptions to the comparisons are uncovered.

The meter tube expert can be further interrogated with respect to the exceptions noted between the criteria for specific meter tubes. Conflicting design characteristics can be resolved by a panel evaluation of a group of meter tube experts. The exceptions can be resolved to improve the design, or resolve the conflicting designs, or standardized the particular methodology. The results of such an analysis provide essential information, such as, formulas, limits with respect to minima and maxima, formula relationships, part relationships, design limits as well as general rules.

FIG. 1 is a schematic diagram illustrating the interactive data entry system of the present invention for the design, engineering and manufacture of meter tubes. Typically, an end user or customer has a proposed fluid transfer system which requires monitoring. The customer would approach the user of the present invention with the design criteria he desires for the particular fluid transfer system. A sales representative would accept the end user criteria for inclusion into a terminal 10. The terminal 10 is interactive with a central processing unit (CPU) 12. The central processing unit 12 utilizes as the criteria associated with the A.G.A. Report No. 3, user standard practice as determined from information acquired from actual experts and related industry standards. The CPU 12 communicates with the plotter 14 for producing the drawing 16. The drawing 16 is an adapted fluid transfer system as proposed by the customer after the proposed fluid transfer system has been adapted to comply with all appropriate standards, criteria and restraints pursuant to the apparatus of the present invention.

In FIG. 1, the criteria calculated by the CPU 12 and embodied in the drawing 16 is transferred to the manufacturing facility 20. In the manufacturing facility 20, the required parts 22 are disbursed to the respective part fabrication components 24. The part fabrication components 24 provide detailed machining to fabricate each part required to create the meter tube illustrated in the drawing 16. The parts 22 are assembled by an assembly unit 26 for the manufacture of the meter tube 28. The meter tube 28 provides all of the industry acceptable features requested by the end user for adaptation to the site specific fluid transfer system.

Figure 2:
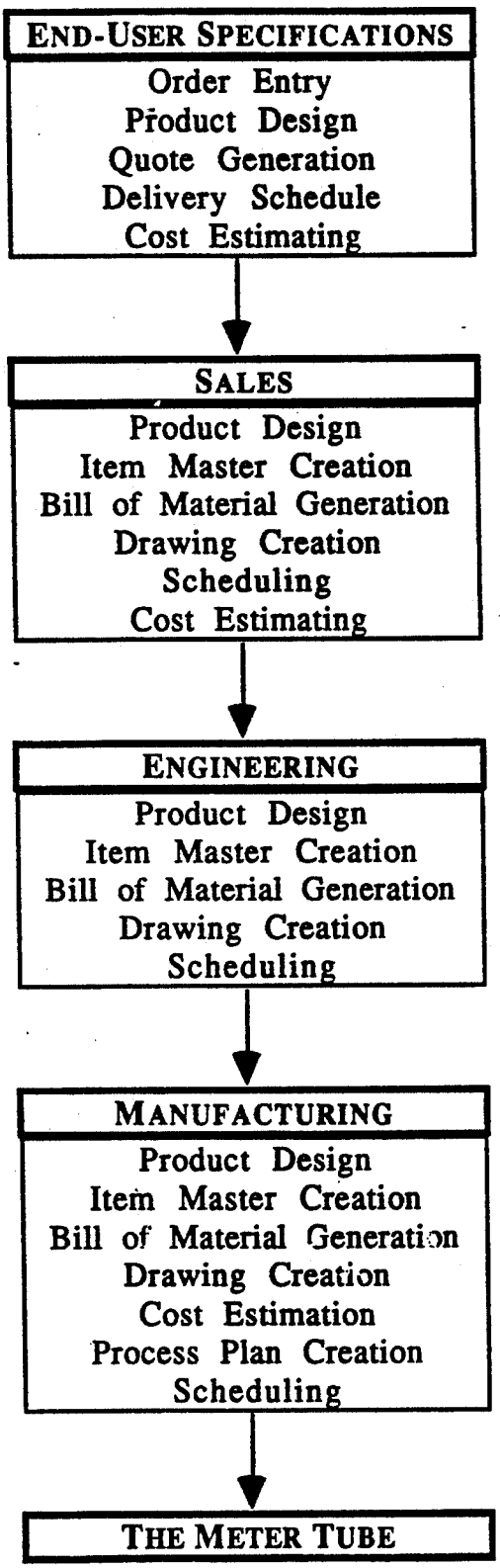
FIG. 2 is a flow diagram illustrating the relationship of manpower and materials in the design of a meter tube.

FIG. 2 is a flow diagram illustrating the relationship of manpower and material in the design of a meter tube. It is common practice in the prior art to design and redesign meter tubes at several different stages. A design for the proposed meter tube can initiate from the end user, from the sales personnel, from the engineering personnel and from the manufacturing personnel. Generic input or order entry information is provided from the end user to the sales personnel. The sales personnel will typically provide a rough product design based upon the order entry information. Also, the sales personnel provides a price quotation and an estimated delivery time. Further, sales personnel typically provide a rough cost estimate with respect to the design, engineering and manufacture of the specific meter tube.

The engineering of a meter tube would comprise the design of the product based upon all restraints, standards and general practices in the industry. An item master would be created and a bill of material would be generated. The bill material would be utilized to implement a drawing. Based upon the design implemented for the particular situation, an estimated schedule and cost estimate could be prepared.

With respect to manufacturing the meter tube utilizing the present invention, the detailed engineering data is used. For example, an item master bill of material and drawings can be adapted and implemented for the automated manufacturing of the meter tube. Utilizing the product design, an accurate manufacturing cost can be estimated. Also, a process plan can be created. Based upon an evaluation of the manufacturing information scheduling of manufacturing time and shipment is readily prepared.

It should be noted that the present invention provides for an interactive data entry system and method whereby meter tubes can be designed and manufactured in a process state rather than a batch state. It has been common practice in the art to utilize a batch technology in the sale, engineering and manufacturing of meter tubes. Thus, many parts are required to be stocked, cost estimating is difficult and scheduling is unreliable. The utilization of the interactive data entry system and method of the present invention as illustrated in FIG. 1 and FIG. 2 greatly enhance the state of the art of designing and manufacturing meter tubes.

Figure 3:
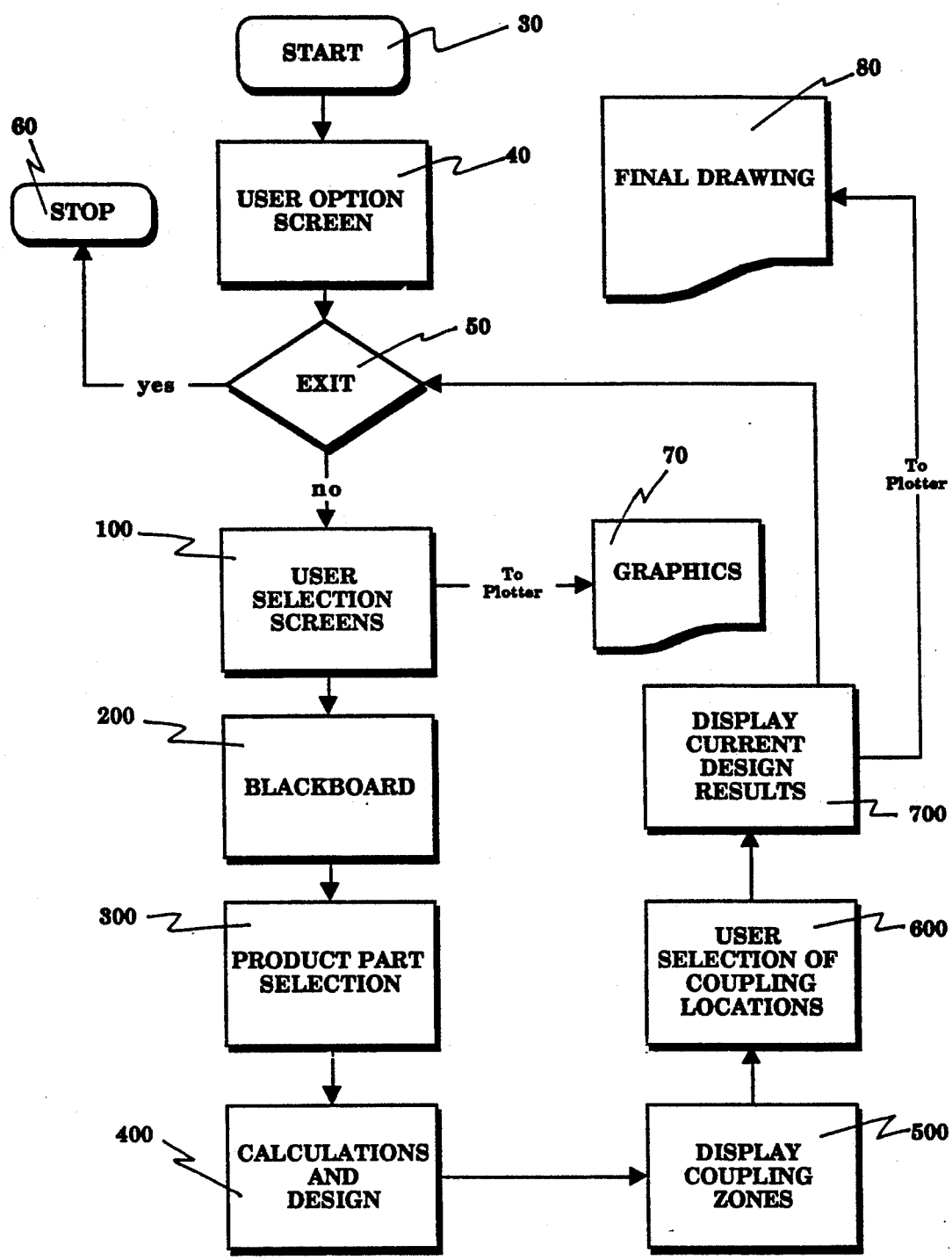
FIG. 3 is a schematic diagram illustrating one embodiment of the design of a meter tube utilizing the interactive data entry system of the present invention.

FIG. 3 is a schematic diagram illustrating the computer design of a meter tube using the interactive data entry system or method of the present invention. FIG. 3 can be the flow of responses which would be prompting the operator of the terminal 10 as illustrated in FIG. 1. Initially, a terminal associated with the interactive data entry system of the present invention activates the software of the present invention. The activation of the software is represented by the start symbol 30 in FIG. 3. After the software is engaged, a user option screen 40 comes into view whereby the user has the option to exit or implement a meter tube design. If the user exits the software is terminated as indicated by the stop symbol 60. If the user elects to continue the program, a user selection screen 100 is implemented. When the user selection screen 100 is implemented, the user is prompted to engage or disengage the plotting routine as illustrated as graphics 70.

A design of a meter tube, as illustrated in FIG. 3, can be generally described. The selections are made based upon prior constraints. The software goes to the appropriate location to retrieve the part numbers and dimensional information of each element of the meter tube assembly. Generally, the size of the component parts is maintained constant. The length of the pipe can be varied depending on the specific design. Design restrictions are evaluated. For example, the AGA design criteria are generally based on the size of the bore, if a vane exists, what the β-ratio is, and what the upstream and downstream lengths are. Different conventions are readily applicable. The reference point for all-length calculations can be the center of the meter tube, i.e., at the orifice plate, or alternately at the extremities. The implementation and use of such information is readily available to those skilled in the art.

Rather than placing information that changes from time to time in active memory, databases are utilized. Drawings are segmented and placed in a database for ready access. Similarly, costing information is placed in a database. Cost information must be frequently updated and the use of a database allows for such changes.

A preferred software technique utilized in the present invention provide a "blackboard" or "traffic cop" approach to the design analysis. The software associated with "blackboard" decision software is generally termed hierarchal information schemes. The blackboard determines the sequence of events and selects the appropriate portions of the information to access. The blackboard acts to guide the present invention based on the attributes associated with the different parts of the knowledge base. The blackboard approach is known. The adaptation and use of the blackboard approach is within the skill of those in the art.

The product part selection step 300 provides that the parts associated with the requested design criteria are selected. The calculation and design step 400 provides that the parts are implemented and designed pursuant to standard engineering practice and regulations. The display coupling zones step 500 provides that the coupling zones for the specific meter tube design are implemented. The select coupling placement step provides that the couplings can be automatically placed or manually placed or no couplings can be placed at all. The display final design results step 700 provides that the results of the specific meter tube design are provided to the user. The user then has the option to save the design criteria for transfer to the manufacturing facility, to prepare final drawings 80, or to delete the design and reconfigure the meter tube.

The step depicting the user selection screens 100 provides a series of prompts whereby the user responds. A user can adequately design a state of the art, site-specific meter tube without having any expertise in meter tube designs based solely upon the prompts received from the user selection screen 100. Plot request 102 provides a selection for the user to plot the ultimate meter tube or not. The select type of fitting prompt 104 provides that different types of fittings can be selected. For example, senior, simplex, junior or orifice flange union fittings could be selected. The select nominal size prompt allows the user to select the nominal size of the pipe being used. For example, two inch, three inch, four inch, six inch, eight inch, ten inch and twelve inch pipe could be selected. The select pressure prompt 108 provides the user a group of pressures from which to select. For example, the user can select from pressures ranging from 150 pounds to 1500 pounds. If the user has requested that a plot be made, at this time the plotter is authorized to plot the text or legend associated with the fitting, pipe size and pressure characteristics.

The menu displayed on the user selection screens 100 always changes based upon prior selections. The subsequently viewed screen is selected based upon the answer to the prior questions. Thus, the user selection screens 100 are constraint driven. The interactive data entry system of the present invention tells the operator what can be selected based upon what has previously been selected. Simply stated, the selections offered at each menu are constrained by previous choices so that no bad choices can be made.

The select bore prompt 110 provides that the user can select from a group of piping bores. The select bore prompt 110 leads into the select fitting connection prompt 112. The select fitting connections prompt 112 provides the user with options for various fitting connections. For example, the user can select raised face flanged and raised face flangnek as well as variations of each. The software provides that the fitting end pipe structures are sent to the plotter via step 132. The select fitting connections prompt 112 leads into the select trim prompt 114. The select trim prompt 114 provides that, for example, either standard trim or sour gas trim could be selected. The plotter is then activated to print the associated text as represented in step 134. The select trim prompt 114 leads into the select type of pipe prompt 116. The select type of pipe prompt 116 provides that, for example, either domestic pipe or Japanese pipe or honed pipe may be selected. Once the type of pipe is selected the step 136 provides that the associated text is sent to the plotter. The select type of pipe prompt 116 leads into the select meter tube end connection prompt 118. The select meter tube end connections prompt 118 provides that various end connections can be selected. For example, end connections available might be raised face weldneck flange, ring type joint weldneck flange, 125 RMS raised face weldneck flange, raised face slip-on flange and weld in. When the user has selected the desired meter tube end connection, the plotter is activated to draw the appropriate end flange as indicated in step 138. The select meter tube end connections prompt 118 leads into the select β-ratio prompt 120. The β-ratio, as previously described, can be selected from A.G.A. standards or specific manufacture standards. When the β-ratio is selected, the plotter is activated and the associated text printed as illustrated in step 140. The select β-ratio step 120 leads into the select A.G.A. figure prompt 122. The appropriate figure depends on the specific situation in which the design criteria are being applied. Typically, cases are restricted to FIGS. 4, 5, 6, 7 and 8 of A.G.A. Report No. 3. Once the desired figure is selected, the plotter is activated to print the associated text as indicated in step 142.

The select A.G.A. figure prompt 122 leads in the select type of vane prompt 124. The select type of vane prompt 124 allows for the selection of various types of straightening vanes used in the upstream pipe prior to the fluid reaching the orifice meter. For example, the straightening vanes which might be utilized are flange-type vanes, line-type vanes or no vane at all. After the vane type is selected, the plotter is activated to insert the vane and associated text as indicated in step 144. Based on the location of the vanes, the cut length of the pipe can be calculated.

After select type of vane prompt 124, the enter up and down streams lengths prompt 126 is activated. At this point, the user is prompted with respect to A.G.A. minimums for the upstream length and the downstream length. Also, the software calculates A.G.A. approved zones for the placement of couplings. The present invention utilizes zones which are used to inform the user of what can or cannot be done. The zones are presented in the information screens.

During the implementation of the user prompts 102, 104, 106, 108, 110, 112, 114, 116, 118, 120, 122, 124 and 126, the blackboard 200 is utilized to segregate the needed hierarchal data from the unneeded hierarchal data. It is after the appropriate hierarchal information has been segregated that the part selection 300 and design 400 can be implemented.

Figure 5:
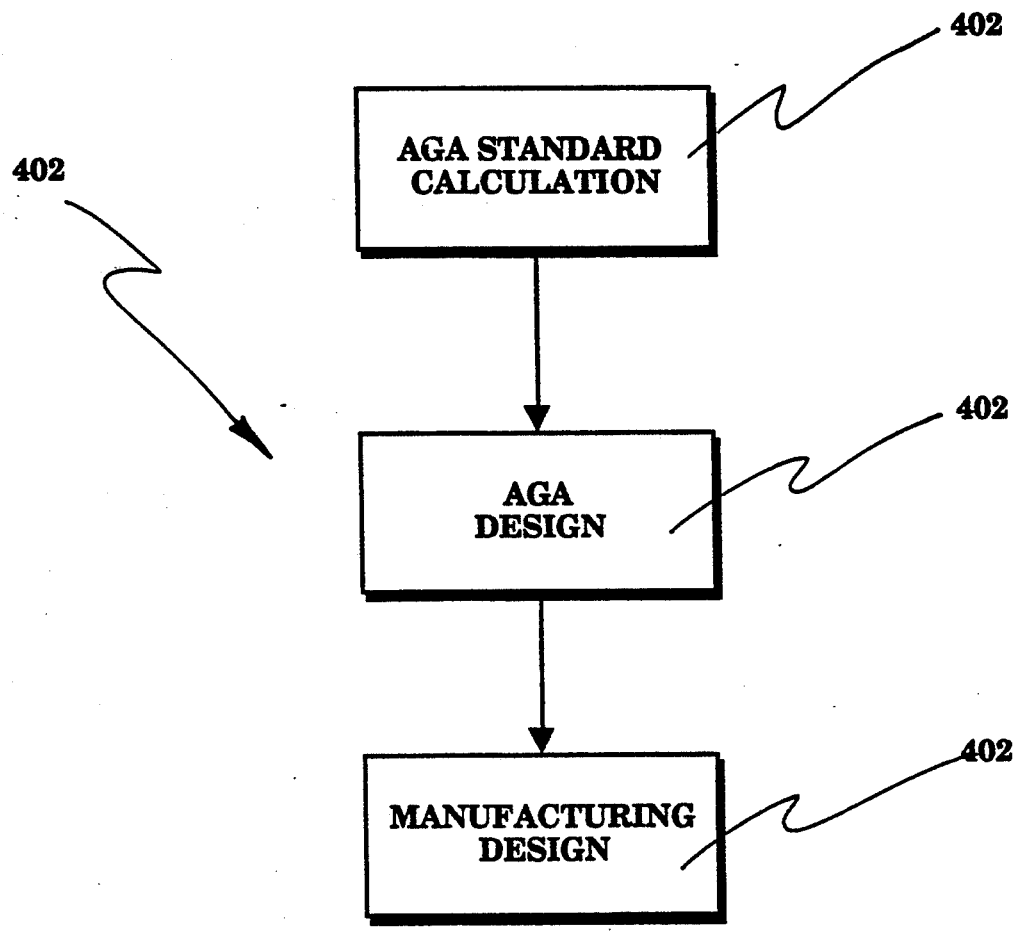
FIG. 5 is a schematic diagram illustrating the steps used in the calculation and design portion of the schematic depicted in FIG. 3.

FIG. 5 illustrates the various steps comprised in the calculation and design 400 of FIG. 3. First, the A.G.A. standard is calculated. For all practical purposes, it is considered that the A.G.A. standards are implemented as restraints. Thus, no design is allowed fall outside the scope of the A.G.A. standards. After the A.G.A. standards have been appropriately calculated for the particular site-specific meter tube design, the A.G.A. design is implemented as indicated in step 104. After the A.G.A. design step 104, the manufactures design step 406 is implemented. The manufactures design step 406 is applicable when the design is required to differ from that of the A.G.A. design. After the design 400 is completely implemented, the coupling zones step 500 is implemented.

Figure 6:
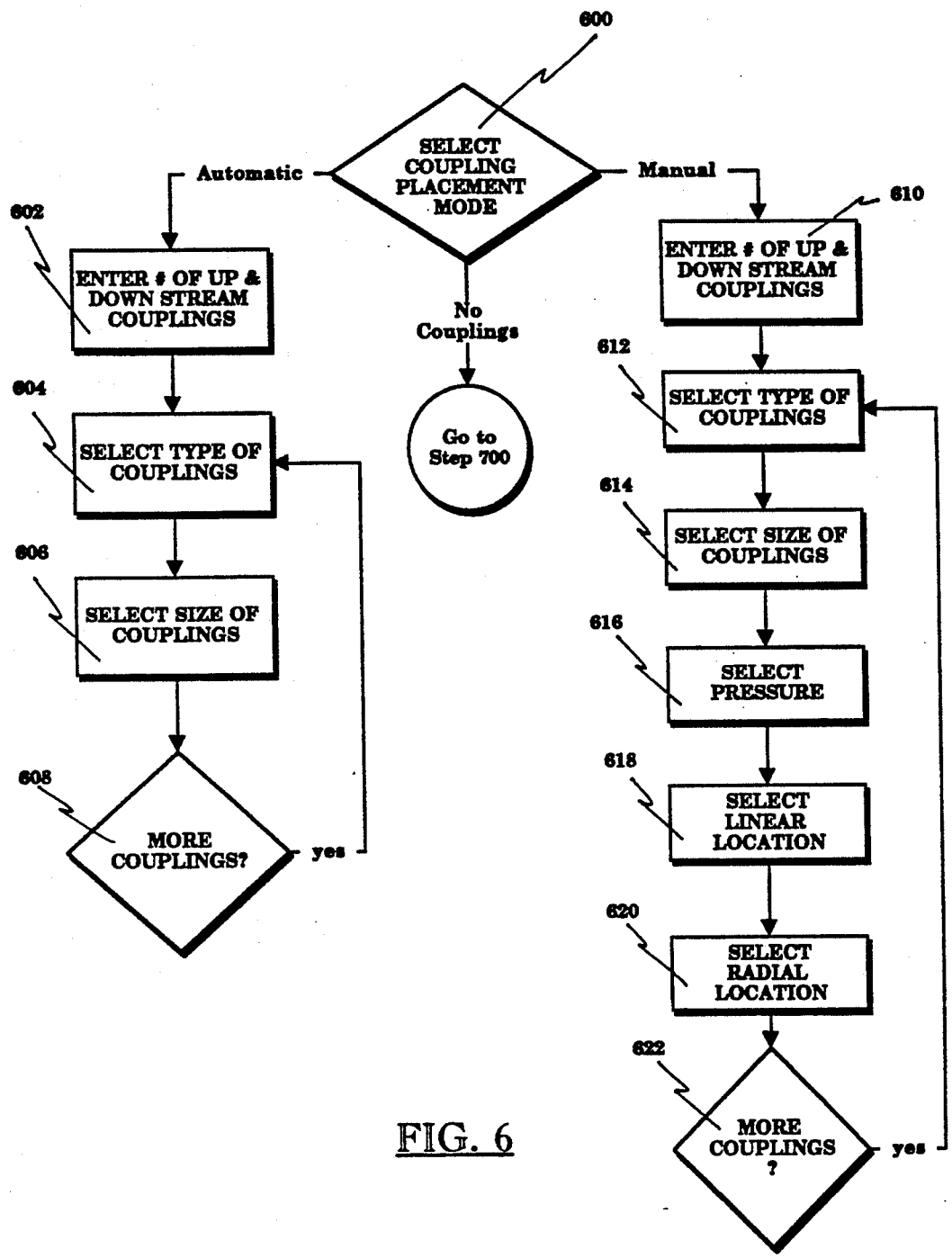
FIG. 6 is a schematic diagram illustrating the steps used in the calculation of the coupling placement as depicted in FIG. 3, including the steps for automatic placement and the steps for manual placement.

FIG. 6 illustrates the select coupling placement step 600 which follows the coupling zones step 500. The select coupling placement step 600 has three basic paths: automatic, manual and no couplings. If no couplings are selected the software provides that the display final design results step 700 is implemented. In principle, FIG. 6 is a schematic diagram illustrating the steps used in the calculation of the coupling placement depicted in FIG. 3, including the various steps associated with the automatic placement and the manual placement of the couplings. Constraints which have been included in the software of the present invention to properly place couplings are: checks for physical interference whether longitudinal or rotational, limits the number of upstream couplings to six and the number of downstream couplings to six based upon experience of the actual experts, places couplings beginning from the extremities toward the orifice plate, checks the placement of couplings to assure that no coupling is within four inches of another coupling in the same plane, places couplings no closer than four inches from a weld or an outer end, with couplings placed having the same rotational relationship with respect to the central axes of the meter tube, couplings are placed no closer than six inches, all AGA and other applicable restricted zones are honored with respect to not placing couplings.

FIG. 6 illustrates, with respect to the automatic placement of couplings, four primary steps. First the prompt 602 requests that the user enter the number of upstream and the number of downstream couplings requested. The prompt 604 requests the type of coupling to be utilized. For example, the type of downstream couplings may be threadolet, sockolet or latrolet. Further, as example only, if threadolet is selected for the downstream coupling, the size of the threadolet coupling must be determined. The select size of couplings prompt 606 provides that the user can select couplings sizes. For example, sizes may vary from one-half inch couplings to one inch couplings by increments of one-quarter inch. Similarly, additional couplings may be selected by implementing the more couplings prompt 608. Thus, there may be several upstream couplings and several downstream couplings, if the standards and general practice in the art allows such couplings.

Also, FIG. 6 depicts the steps associated with the manual selection of coupling placement. Similar to the automatic selection, the inner number of upstream and downstream couplings prompt 610 requests the user to enter the number of couplings to be implemented in the site specific design. The select type of couplings prompt 612 and the select size of couplings prompt 614 correspond with the respective automatic prompts 604 and 606. The select pressure prompt 616 provides that a pressure can be selected for the respective coupling placements. Subsequent to the select pressure prompt 616, a select linear location prompt 618 requires the user to select a linear location. Subsequent to the linear location prompt 618, the radial location prompt 620 requires that the user select the desired radial location. The more couplings calculation 622 provides that the prompts 612, 614, 616, 618 and 620 are re-engaged until the number of couplings entered in prompt 610 have been manually placed.

FIG. 7 illustrates an example of the legend information which accompanies a plot of a site-specific meter tube which has been designed, engineered and manufactured according to the interactive data entry system and method of the present invention. The system and method of the present invention can additionally provide costing information based upon the parts as selected. The costs and associated parts can be readily accessed from a relational data base or other data retrieval mechanism.

Figure 8:
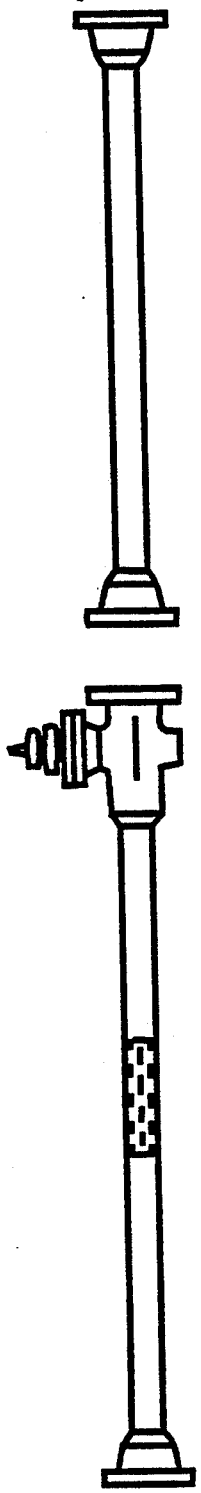
FIG. 8 illustrates an example of the pictorial display of a designed meter tube which accompanies the plot created by the interactive data entry system of the present invention.

FIG. 8 illustrates an example of the pictorial display which accompanies the plot of the meter tube designed and fabricated pursuant to the legend information of FIG. 7. Each segment of the meter tube is drawn when enough information exists of the design to reach a conclusion with respect to the structure. For example, if a "senior" is selected, not enough information exists to initiate the drawing. Additional information must be available for the type of connectors associated with the "senior." Thus, each drawing is comprised of a group of objects. As the objects are selected based upon the conclusions reached, the selected objects are drawn.

In the present embodiment, a standard CAD program was used to draw the figures and associated objects. The figures were sent to a file to capture the plotter language. Thereafter, the figure or object can be readily drawn by accessing the captured file.

Appendix I is a print-out of a user consultation illustrating user interactions employing the present invention for a fully automatic consultation for the design of a meter tube. Appendix II is a print-out of a debugging consultation illustrating the user interactions utilizing the present invention for evaluating potential problems which might exist. More particularly, the debugging consultation mode provides an image of the interactive data entry process of the present invention.

APPENDIX I
USER CONSULTATION

METER TUBE EXPERT SYSTEM

DANIEL INDUSTRIES

WRITTEN BY BUFORD B. WILSON

CHOOSE OPTION:
1 - METER TUBE
2 - EXIT
>>

1

PLOT
   1 - YES - PLEASE LOAD PAPER INTO PLOTTER NOW IF 'YES' IS YOUR CHOICE
   2 - NO
**>2

SELECT THE TYPE FITTING
   1 - SENIOR
   2 - SIMPLEX
   3 - JUNIOR
   4 - ORIFICE FLANGE UNION
**>1

SELECT THE NOMINAL SIZE
   1 - 2"
   2 - 3"
   3 - 4"
   4 - 6"
   5 - 8"
   6 - 10"
   7 - 12"
**>3

SELECT THE PRESSURE
   1 - 150#
   2 - 300#
   3 - 600#
   4 - 900#
   5 - 1500#
**>3

SELECT THE BORE
   1 - SCHEDULE STANDARD
   2 - SCHEDULE 40
   3 - SCHEDULE XH
   4 - SCHEDULE 80
   5 - SCHEDULE 120
   6 - SCHEDULE 160
   7 - SCHEDULE XXH
**>4

```
    SELECT THE STYLE FITTING CONNECTIONS
    1 - RAISED FACE FLANGED
    2 - RAISED FACE FLANGED - 125RMS FLANGE FACE W/FLEXITALIC GASKETS
    3 - RAISED FACE FLANGNEK
    4 - RAISED FACE FLANGNEK - 125RMS FLANGE FACE W/FLEXITALIC GASKETS
    5 - RING TYPE JOINT FLANGED
    6 - RING TYPE JOINT FLANGNEK
    7 - WELDNEK
**>3

SELECT THE TRIM
    1 - STANDARD
    2 - SOUR GAS (AASG)
**>1

SELECT TYPE OF PIPE
    1 - DOMESTIC PIPE
    2 - JAPANESE PIPE
    3 - HONED PIPE
**>1

SELECT METER TUBE END CONNECTIONS
    1 - RAISED FACE WELDNECK FLANGE
    2 - RING TYPE JOINT WELDNECK FLANGE
    3 - 125RMS RAISED FACE WELDNECK FLANGE
    4 - RAISED FACE SLIP-ON FLANGE
    5 - WELD END
**>1

SELECT THE BETA RATIO
 *  1 - DANIEL CATALOG .75 BETA
    2 - OTHER BETA'S
**>2
    ENTER THE BETA RATIO
 >>.65

Figure 4:
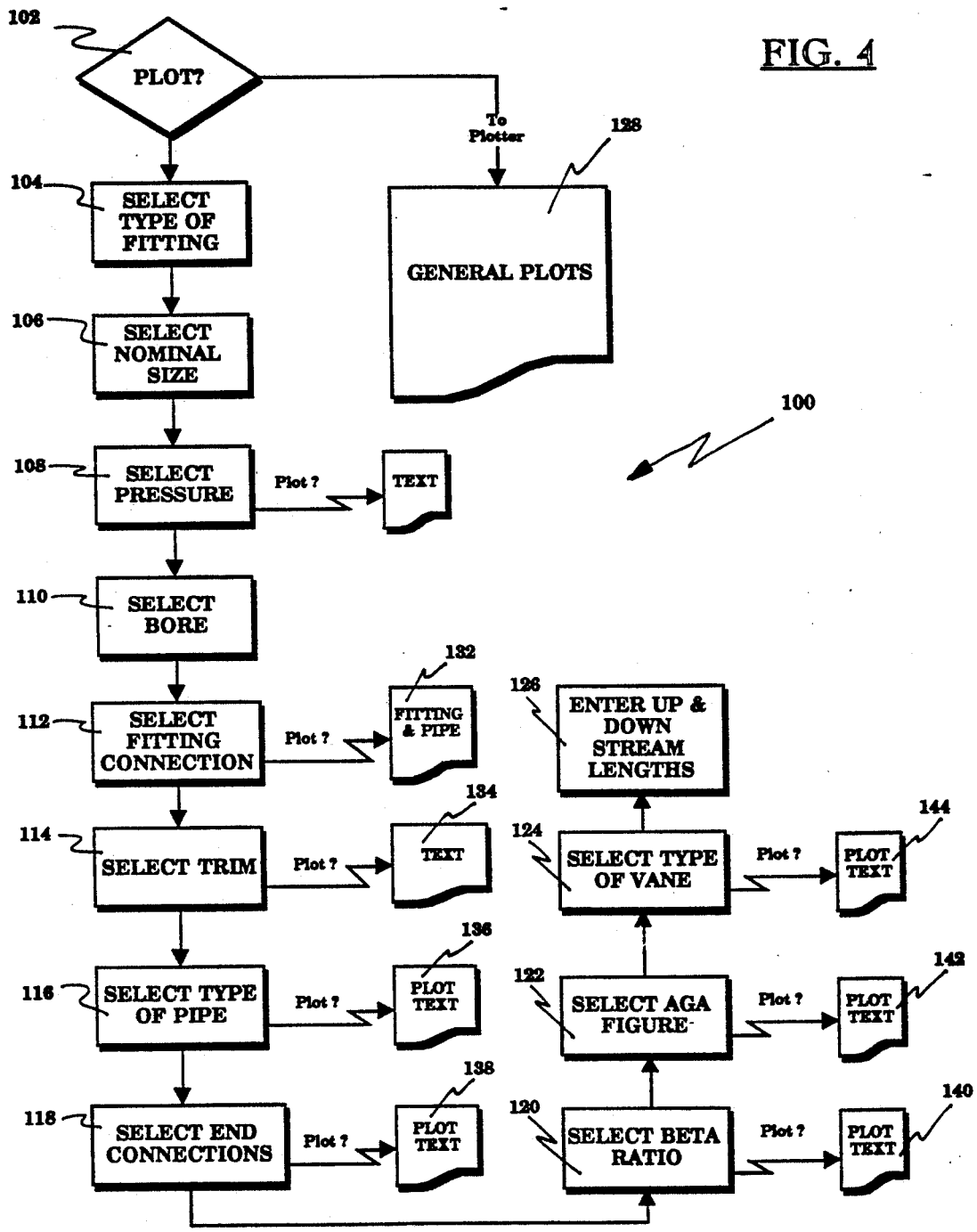
FIG. 4 is a schematic diagram illustrating the user selections in the presently preferred embodiment of the interactive data entry system of the present invention as depicted in FIG. 3.

SELECT THE AGA FIGURE
    1 - AGA FIGURE 4 (DANIEL FIG 6)
    2 - AGA FIGURE 5 (DANIEL FIG 4)
    3 - AGA FIGURE 6 (DANIEL FIG 3)
    4 - AGA FIGURE 7 (DANIEL FIG 2)
    5 - AGA FIGURE 8 (DANIEL FIG 5)
**>2

SELECT TYPE OF STRAIGHTENING VANE
    1 - FLANGE TYPE VANE
    2 - LINE TYPE VANE
    3 - NO VANE REQUIRED
**>2
    ENTER U/S LENGTH (DEC INCH) *WARNING* AGA MIN = 48.2076
 >>75
    ENTER D/S LENGTH (DEC INCH) *WARNING* AGA MIN = 15.9926
 >>30
    COUPLING PLACEMENT ZONES
=================================================================
NOTE: ALL DIM REFERENCED FROM OUTER ENDS TO CL OF PLATE
      OUTER U/S END = 0      OUTER D/S END = 0
=================================================================
PHYSICAL INTERFERENCE ZONES (NO COUPLINGS ALLOWED)
-----------------------------------------------------------------
      UPSTREAM                  DOWNSTREAM
   0.0000 TO  6.2500          0.0000 TO  6.2500
  26.2652 TO 40.2652         17.3125 TO 30.0000
  66.3750 TO 75.0000

AGA APPROVED ZONES (AUTO AND MANUAL PLACING ALLOWED)
-----------------------------------------------------------------
   6.2500 TO 13.3962
                              6.2500 TO 14.0074
```

NON-AGA ZONES (ONLY MANUAL PLACING ALLOWED)
---------------------------------------------------------------
13.3962 TO 26.2652
                        14.0074 TO 17.3125
40.2652 TO 66.3750

-RETURN- to Continue
\>\>

COUPLING PLACEMENT MODE
   1 - AUTOMATIC
   2 - MANUAL
   3 - NO COUPLINGS
\*\*\>1
    ENTER # OF U/S COUPLINGS - MAX = 1
\>\>1
    ENTER # OF D/S COUPLINGS - MAX = 1
\>\>1

SELECT THE TYPE UPSTREAM COUPLING
   1 - THREADOLET
   2 - SOCKOLET
   3 - LATROLET
\*\*\>1

THREADOLET
   1 - 1/2" COUPLING
   2 - 3/4" COUPLING
   3 - 1" COUPLING
\*\*\>1

SELECT THE TYPE DOWNSTREAM COUPLING
   1 - THREADOLET
   2 - SOCKOLET
   3 - LATROLET
\*\*\>2

SOCKOLET
   1 - 1/2" COUPLING
   2 - 3/4" COUPLING
   3 - 1" COUPLING
\*\*\>2
THESE ARE YOUR SELECTIONS
================================================================
SENIOR
NOMINAL SIZE = 4"
PRESSURE = 600 PSI
SCHEDULE 80 = 3.8260
RAISED FACE FLANGNEK
STANDARD TRIM
DOMESTIC PIPE
RAISED FACE FLANGED TUBE ENDS
BETA = .6500
AGA FIG 5 (DANIEL FIG 4)
LINE VANE
U/S TUBE LENGTH = 75.0000   AGAMIN = 48.2076
D/S TUBE LENGTH = 30.0000   AGAMIN = 15.9926
1    U/S COUPLINGS // 1   D/S COUPLINGS
AUTOMATIC COUPLING LOCATOR

-RETURN- to Continue
  \>\>

| PART NAME | UM | QTY | PART NO. | U/S LG (INCHES) | D/S LG (INCHES) |
|---|---|---|---|---|---|
| SENIOR | EA | 1.0000 | P20119032 | 6.6250 | 6.6250 |
| CMPN FL KIT | EA | 1.0000 | P01213070 | | 4.0000 |
| (GASKET) | | | | | .0625 |

```
DOMES PIPE   FT   6.5989 P60302720            64.1250  15.0625
RF END CONN  EA   2.0000 P32102502             4.2500   4.2500
VANE         EA   1.0000 P21403026
-SET SCREW   EA   1.0000 P56052170
-THREADOLET  EA   1.0000 P50704082
-PIPE PLUG   EA   1.0000 P50701103
1/2"3000THD  EA   1      P50704082
3/4"3000SCK  EA   1      P3-4 3000#3/4"SCKLT
```

-RETURN- to Continue
>>
```
  DESC           LOCATION    DEG  PART#
---------------------------------------------------
LVANE CPLG#1   48.3598       0  P50704082
U/S COUPLING #1 10.2500      0  P50704082
D/S COUPLING #1 10.2500      0  P3-4 3000#3/4"SCKLT
```

-RETURN- to Continue
>>

APPENDIX II

DEBUGGING CONSULTATION

METER TUBE EXPERT SYSTEM

DANIEL INDUSTRIES

WRITTEN BY BUFORD B. WILSON

```
   CHOOSE OPTION:
   1 - METER TUBE
   2 - EXIT
   >>

1

PLOT
   1 - YES - PLEASE LOAD PAPER INTO PLOTTER NOW IF 'YES' IS YOUR CHOICE
   2 - NO
**>SET MANUAL
     *** Set to:  MANUAL DEBUG MODE ***

PLOT
   1 - YES - PLEASE LOAD PAPER INTO PLOTTER NOW IF 'YES' IS YOUR CHOICE
   2 - NO
**>2

START
 *  1 - SELECT THE TYPE FITTING
 *  2 - SIZE BRANCH
 *  3 - SELECT THE PRESSURE
 *  4 - BORE BRANCH
 *  5 - SELECT THE STYLE FITTING CONNECTIONS
 *  6 - SELECT THE TRIM
 *  7 - SELECT TYPE OF PIPE
 *  8 - END CONNECTIONS
 *  9 - SELECT THE BETA RATIO
 * 10 - SELECT THE AGA FIGURE
```

```
*  11 - SELECT TYPE OF STRAIGHTENING VANE
*  12 - AGA MINIMUM CALCS
*  13 - METER TUBE LENGTHS
**>

SELECT THE TYPE FITTING
    1 - SENIOR
    2 - SIMPLEX
    3 - JUNIOR
    4 - ORIFICE FLANGE UNION
**>1

SIZE BRANCH
*   1 - SELECT THE NOMINAL SIZE
    2 - SELECT THE NOMINAL SIZE
    3 - SELECT THE NOMINAL SIZE
**>

SELECT THE NOMINAL SIZE
    1 - 2"
    2 - 3"
    3 - 4"
    4 - 6"
    5 - 8"
    6 - 10"
    7 - 12"
**>3

SELECT THE PRESSURE
    1 - 150#
    2 - 300#
    3 - 600#
    4 - 900#
    5 - 1500#
**>3

600#
    1 - PFILE='C:±PLOT±P600.PLA'
*   2 - NO PLOT
**>

BORE BRANCH
*   1 - BORE SIZE BRANCH
    2 - BORE SIZE BRANCH
**>

BORE SELECTOR
    1 - 2"
    2 - 3"
*   3 - 4"
    4 - 6"
**>

4"
*   1 - SELECT THE BORE
    2 - SELECT THE BORE
    3 - SELECT THE BORE
**>

SELECT THE BORE
    1 - SCHEDULE STANDARD
    2 - SCHEDULE 40
    3 - SCHEDULE XH
    4 - SCHEDULE 80
    5 - SCHEDULE 120
    6 - SCHEDULE 160
    7 - SCHEDULE XXH
**>4
```

```
    SELECT THE STYLE FITTING CONNECTIONS
    1 - SELECT THE STYLE FITTING CONNECTIONS
*   2 - SELECT THE STYLE FITTING CONNECTIONS
    3 - SELECT THE STYLE FITTING CONNECTIONS
    4 - SELECT THE STYLE FITTING CONNECTIONS
    5 - SELECT THE STYLE FITTING CONNECTIONS
    6 - SELECT THE STYLE FITTING CONNECTIONS
    7 - OFU STYLE
**>

SELECT THE STYLE FITTING CONNECTIONS
    1 - RAISED FACE FLANGED
    2 - RAISED FACE FLANGED - 125RMS FLANGE FACE W/FLEXITALIC GASKETS
    3 - RAISED FACE FLANGNEK
    4 - RAISED FACE FLANGNEK - 125RMS FLANGE FACE W/FLEXITALIC GASKETS
    5 - RING TYPE JOINT FLANGED
    6 - RING TYPE JOINT FLANGNEK
    7 - WELDNEK
**>3

RAISED FACE FLANGNEK
    1 - PFILE='C:±PLOT±SRRFFN.PLA'
*   2 - NO PLOT
**>

SELECT THE TRIM
    1 - STANDARD
    2 - SOUR GAS (AASG)
**>1

STANDARD
    1 - PFILE='C:±PLOT±STDTRM.PLA'
*   2 - NO PLOT
**>

SELECT TYPE OF PIPE
    1 - SELECT TYPE OF PIPE
*   2 - SELECT TYPE OF PIPE
**>

SELECT TYPE OF PIPE
    1 - DOMESTIC PIPE
    2 - JAPANESE PIPE
    3 - HONED PIPE
**>1

DOMESTIC PIPE
    1 - PFILE='C:±PLOT±DOMES.PLA'
*   2 - NO PLOT
**>

END CONNECTIONS
    1 - SELECT METER TUBE END CONNECTIONS
*   2 - SELECT METER TUBE END CONNECTIONS
    3 - SELECT METER TUBE END CONNECTIONS
**>

SELECT METER TUBE END CONNECTIONS
    1 - RAISED FACE WELDNECK FLANGE
    2 - RING TYPE JOINT WELDNECK FLANGE
    3 - 125RMS RAISED FACE WELDNECK FLANGE
    4 - RAISED FACE SLIP-ON FLANGE
    5 - WELD END
**>1

RAISED FACE WELDNECK FLANGE
    1 - PFILE='C:±PLOT±RFWN.PLA'
*   2 - NO PLOT
**>
```

```
    SELECT THE BETA RATIO
*   1 - DANIEL CATALOG .75 BETA
    2 - OTHER BETA'S
**>2

OTHER BETA'S
*   1 - BETA.4[0.1,0.75] ENTER THE BETA RATIO
**>
    ENTER THE BETA RATIO
 >>.65

OTHER BETA'S
    1 - 150
*   2 - NO PLOT
**>

SELECT THE AGA FIGURE
    1 - SELECT THE AGA FIGURE
*   2 - SELECT THE AGA FIGURE
**>

SELECT THE AGA FIGURE
    1 - AGA FIGURE 4 (DANIEL FIG 6)
    2 - AGA FIGURE 5 (DANIEL FIG 4)
    3 - AGA FIGURE 6 (DANIEL FIG 3)
    4 - AGA FIGURE 7 (DANIEL FIG 2)
    5 - AGA FIGURE 8 (DANIEL FIG 5)
**>2

AGA FIGURE 5 (DANIEL FIG 4)
    1 - PFILE='C:±PLOT±AGA5.PLA'
*   2 - NO PLOT
**>

VANE
    1 - NO VANE REQUIRED
*   2 - VANE
**>

VANE
    1 - SELECT TYPE OF STRAIGHTENING VANE
*   2 - SELECT TYPE OF STRAIGHTENING VANE
    3 - NO VANE REQUIRED
**>

SELECT TYPE OF STRAIGHTENING VANE
    1 - FLANGE TYPE VANE
    2 - LINE TYPE VANE
    3 - NO VANE REQUIRED
**>2

LINE TYPE VANE
    1 - PFILE='C:±PLOT±LVANE.PLA'
*   2 - NO PLOT
**>

START
*   1 - SIZE
*   2 - START
*   3 - CALC OF MIN LENGTHS
*   4 - MINIMUM LENGTH CALCULATIONS
**>

SIZE
    1 - SIZE.1 = 2
    2 - SIZE.1 = 3
*   3 - SIZE.1 = 4
    4 - SIZE.1 = 6
    5 - SIZE.1 = 8
```

```
     6 - SIZE.1 = 10
     7 - SIZE.1 = 12
**>

SIZE.1 = 4
*  1 - SIZE.1 = 4
**>

SIZE.1 = 4
   1 - BORE.4 = 4.026
   2 - BORE.4 = 4.026
   3 - BORE.4 = 3.826
*  4 - BORE.4 = 3.826
   5 - BORE.4 = 3.624
   6 - BORE.4 = 3.438
   7 - BORE.4 = 3.152
**>

BORE.4 = 3.826
   1 - PFILE='C:±PLOT±S4S80.PLA'
*  2 - NO PLOT
**>

START
   1 - FIGDAN
   2 - FIG4
*  3 - FIG5
   4 - FIG6
   5 - FIG7
   6 - FIG8
**>

START
   1 - BETA LE .38
*  2 - BETA LE .75
   3 - OTHER
**>

START
    1 - BETA LE .40
    2 - BETA LE .42
    3 - BETA LE .44
    4 - BETA LE .46
    5 - BETA LE .48
    6 - BETA LE .50
    7 - BETA LE .52
    8 - BETA LE .54
    9 - BETA LE .56
   10 - BETA LE .58
   11 - BETA LE .6
   12 - BETA LE .62
   13 - BETA LE .64
*  14 - BETA LE .66
   15 - BETA LE .68
   16 - OTHER
**>

BETA LE .66
*  1 - A.4 = 28.3
*  2 - A1.4 = 12.6
*  3 - B.4 = 4.18
*  4 - C.4 = 6.1
*  5 - C1.4 = 6.5
**>

CALC OF MIN LENGTHS
   1 - NO CALC FOR DANIEL .75 BETA CATALOG
*  2 - YES CALC FOR ALL BETA'S
**>
```

```
    YES CALC FOR ALL BETA'S
*   1 - ALG.4 = BORE * A
*   2 - A1LG.4 = BORE * A1
*   3 - BLG.4 = BORE * B
*   4 - CLG.4 = BORE * C
*   5 - C1LG.4 = BORE * C1
**>

MINIMUM LENGTH CALCULATIONS
*   1 - MIN LG WITH VANE
    2 - MIN LG WITH NO VANE
**>

MIN LG WITH VANE
*   1 - AGAUS.4 = A1LG
*   2 - AGADS.4 = BLG
**>

METER TUBE LENGTHS
*   1 - USLG.4 ENTER U/S LENGTH (DEC INCH) *WARNING* AGA MIN = 48.2076
*   2 - DSLG.4 ENTER D/S LENGTH (DEC INCH) *WARNING* AGA MIN = 15.9926
*   3 - CLEAR SCREEN
**>
    ENTER U/S LENGTH (DEC INCH) *WARNING* AGA MIN = 48.2076
 >>75
    ENTER D/S LENGTH (DEC INCH) *WARNING* AGA MIN = 15.9926
 >>30

SELECT FTG
*   1 - SR
    2 - SX
    3 - JR
    4 - OFU
*   5 - DOMESTIC PIPE SELECTOR
    6 - JAPANESE PIPE SELECTOR
    7 - HONED PIPE SELECTOR
*   8 - VANE SELECTOR
*   9 - END CONNECTION SELECTOR
**>

FTG
    1 - 2" FTG
    2 - 3" FTG
*   3 - 4" FTG
    4 - 6" FTG
    5 - 8" FTG
    6 - 10" FTG
    7 - 12" FTG
**>

4" FTG
    1 - 150#
    2 - 300#
*   3 - 600#
    4 - 900#
    5 - 1500#
**>

600#
*   1 - STD
    2 - AASG
**>

STD TRIM
    1 - BELOW SCH 80 BORE
*   2 - ABOVE AND INCLUDING SCH 80 BORE
**>
```

```
     ABOVE AND INCLUDING SCH 80
*   1 - SCH 80
    2 - SCH 160
    3 - SCH XXH
**>

SCH 80
    1 - RFFL
    2 - RFFL 125RMS
*   3 - RFFN
    4 - RFFN 125RMS
    5 - RTJFL
    6 - RTJFN
    7 - WN
**>

RFFN
*   1 - SR    = 'P20119032'
*   2 - CFL   = 'P01213070'
*   3 - USFTG.4 = 6.625
*   4 - DSFTG.4 = 6.625
*   5 - CMPLG.4 = 4
**>

SIZE
    1 - 2"
    2 - 3"
*   3 - 4"
    4 - 6"
    5 - 8"
    6 - 10"
    7 - 12"
**>

4"
    1 - PIPE = 'P60302719'
    2 - PIPE = 'P60302719'
    3 - PIPE = 'P60302720'
*   4 - PIPE = 'P60302720'
    5 - PIPE = 'P60302722'
    6 - PIPE = 'P60302724'
    7 - PIPE = 'P60302725'
**>

TYPE
*   1 - LINE VANE
    2 - FLANGE VANE
**>

LINE VANE
    1 - 2"
    2 - 3"
*   3 - 4"
    4 - 6"
    5 - 8"
    6 - 10"
    7 - 12"
**>

SELECT
*   1 - BORE
*   2 - PLUG
*   3 - THREADOLET
*   4 - VANELG.4 = 10.0
**>

BORE
    1 - VANE = 'P21403025'
    2 - VANE = 'P21403025'
```

```
       3 - VANE = 'P21403026'
*      4 - VANE = 'P21403026'
       5 - VANE = 'P21403027'
       6 - VANE = 'P21403028'
       7 - VANE = 'P21403029'
**>

SCH80
*      1 - VSCR = 'P56052170'
       2 - VSCR = 'P56057170'
**>

PLUG
*      1 - VPLUG = 'P50701103'
       2 - VPLUG = 'P50701143'
**>

THREADOLET
*      1 - THDLT = 'P50704082'
       2 - THDLT = 'P50704102'
**>

FLG
       1 - 2" FL
       2 - 3" FL
*      3 - 4" FL
       4 - 6" FL
       5 - 8" FL
       6 - 10" FL
       7 - 12" FL
**>

4" FLG
       1 - 150#
       2 - 300#
*      3 - 600#
       4 - 900#
       5 - 1500#
**>

TYPE
*      1 - FLGLG.4 = 4.25
       2 - FLGLG.4 = 4.3125
       3 - FLGLG.4 = 4.25
       4 - FLGLG.4 = 0.25
**>

FLGLG.4 = 4.25
       1 - FLG = 'P32102500'
       2 - FLG = 'P32102500'
       3 - FLG = 'P32102502'
*      4 - FLG = 'P32102502'
       5 - FLG = 'P4 600RFWN S120'
       6 - FLG = 'P4 600RFWN S160'
       7 - FLG = 'P32102506'
**>

CALCULATIONS
*      1 - GASKET SELECTION
*      2 - END FLANGE LENGTH
*      3 - CALCULATION
*      4 - VANE PARTS
*      5 - FTGQTY.4 = 1
*      6 - PIPE QUANTITY
*      7 - LINE VANE LOCATION
*      8 - COUPLING ZONE IDENTIFIER
**>
```

```
   START
*  1 - FTG TYPE
   2 - OFU - TERMINAL BRANCH
**>

FTG TYPE
   1 - 2"
   2 - 3"
*  3 - 4"
   4 - 6"
   5 - 8"
   6 - 10"
   7 - 12"
**>

4"
*  1 - FTGGSLG.4 = 0.0625
   2 - FTGGSLG.4 = 0.125
   3 - RTJ
   4 - FTGGSLG.4 = 0.0
**>

END FLANGE LENGTH
   1 - FLGLG.4 = 0
*  2 - ENDCNQTY.4 = 2
**>

CALCULATION
   1 - FLANGED
*  2 - FLANGNECK
   3 - WELDNECK
   4 - SLIP-ON
**>

FLANGNECK
*  1 - USPIPE.4 = USLG - USFTG - FLGLG
*  2 - DSPIPE.4 = DSLG - DSFTG - CMPLG - FLGLG - FTGGSLG
*  3 - CFLQTY.4 = 1
**>

VANE PARTS
*  1 - VANEQTY.4 = 1
   2 - VANEQTY.4 = 1
   3 - NO VANE PARTS
**>

VANEQTY.4 = 1
*  1 - BELOW 12" VANE
   2 - 12" VANE
**>

BELOW 12" VANE
*  1 - VPLGQTY.4 = 1
*  2 - VSCRQTY.4 = 1
*  3 - THDLTQTY.4 = 1
**>

PIPE QUANTITY
*  1 - PIPEQTY.4 = (USPIPE + DSPIPE) / 12
**>

LINE VANE LOCATION
*  1 - LINE VANE LOCATION SUBTREE CALL
**>

START
   1 - FLANGED
*  2 - FLANGNEK
```

```
    3 - WELDNEK
    4 - OFU
**>

FLANGNEK
*   1 - LINE VANE 2-4"
    2 - LINE VANE 6-10"
    3 - LINE VANE 12"
    4 - FLANGE VANE OR NONE
**>

LINE VANE 2-4"
    1 - USLG LE AGAUS
*   2 - OTHER
**>

OTHER
*   1 - LVLOC.4 = ((USLG-AGAUS)*.5)+(CLG+(.5*VANELG)+DSFTG)
**>

COUPLING ZONE IDENTIFIER
*   1 - COUPLING ZONE IDENTIFIER
**>

START
*   1 - STANDARD POINTS
*   2 - ZONECALC
**>

STANDARD POINTS
*   1 - USPTA.4 = 0.0
*   2 - USPTZ.4 = USLG
*   3 - DSPTA.4 = 0.0
*   4 - DSPTZ.4 = DSLG
**>

ZONECALC
*   1 - LINE VANE
    2 - FLANGE VANE
    3 - NO VANE
**>

START
*   1 - LINE VANE
*   2 - CHART
**>

LINE VANE
    1 - FLANGED FITTING
*   2 - FLANGNEK FITTING
    3 - WELDNEK FITTING
    4 - OFU W/LINE VANES
**>

FLANGNEK FITTING
*   1 - FLANGED TUBE END CONNECTIONS
    2 - BUTT WELD TUBE END CONNECTIONS
**>

FLANGED TUBE END CONNECTIONS
*   1 - USPTB
*   2 - USPTC.4 = USLG-C1LG+(.5*VANELG)-LVLOC+DSFTG
*   3 - USPTD
*   4 - USPTE
*   5 - USPTF.4 = USLG-2-USFTG
*   6 - DSPTB
*   7 - DSPTC.4 = DSLG-AGADS
*   8 - DSPTF.4 = DSLG-2-CMPLG-FTGGSLG-DSFTG
**>
```

```
    USPTB
    1 - USPTB.4 = RFSOLG+2
*   2 - USPTB.4 = FLGLG+2
**>

USPTD
    1 - USPTD.4 = USLG-LVLOC2-3.5+DSFTG
*   2 - USPTD.4 = USLG-LVLOC-(.5*VANELG)-2+DSFTG
**>

USPTE
    1 - USPTE.4 = USLG-LVLOC+3.5+DSFTG
*   2 - USPTE.4 = USLG-LVLOC+(.5*VANELG)+2+DSFTG
**>

DSPTB
    1 - DSPTB.4 = RFSOLG+2
*  ·2 - DSPTB.4 = FLGLG+2
**>

LINE VANE
*   1 - WRITE      COUPLING PLACEMENT ZONES
*   2 - WRITE ================================================
*   3 - WRITE NOTE: ALL DIM REFERENCED FROM OUTER ENDS TO CL OF PLATE
*   4 - WRITE      OUTER U/S END = 0       OUTER D/S END = 0
*   5 - WRITE ================================================
*   6 - WRITE PHYSICAL INTERFERENCE ZONES (NO COUPLINGS ALLOWED)
*   7 - WRITE ------------------------------------------------
*   8 - WRITE      UPSTREAM                DOWNSTREAM
*   9 - WRITE   0.0000 TO 6.2500         0.0000 TO 6.2500
*  10 - WRITE  26.2652 TO 40.2652       17.3125 TO 30.0000
*  11 - WRITE  66.3750 TO 75.0000
*  12 - AGA ZONES
*  13 - NON AGA ZONES
*  14 - WAIT
*  15 - COUPLING PLACEMENT MODE
**>
       COUPLING PLACEMENT ZONES
================================================================
NOTE: ALL DIM REFERENCED FROM OUTER ENDS TO CL OF PLATE
      OUTER U/S END = 0       OUTER D/S END = 0
================================================================
PHYSICAL INTERFERENCE ZONES (NO COUPLINGS ALLOWED)
----------------------------------------------------------------
      UPSTREAM                DOWNSTREAM
  0.0000 TO 6.2500         0.0000 TO 6.2500
 26.2652 TO 40.2652       17.3125 TO 30.0000
 66.3750 TO 75.0000

AGA ZONES
*   1 - WRITE
*   2 - WRITE AGA APPROVED ZONES (AUTO AND MANUAL PLACING ALLOWED)
*   3 - WRITE ------------------------------------------------
*   4 - UPSTREAM TEST
*   5 - DOWNSTREAM TEST
**>

AGA APPROVED ZONES (AUTO AND MANUAL PLACING ALLOWED)
----------------------------------------------------------------

UPSTREAM TEST
*   1 - USPTC GT USPTB
    2 - OTHER
**>

USPTC GT USPTB
*   1 - WRITE   6.2500 TO 13.3962
**>
  6.2500 TO 13.3962
```

```
    DOWNSTREAM TEST
    1 - DSPTC GT DSPTF
*   2 - DSPTC GT DSPTB
    3 - OTHER
**>

DSPTC GT DSPTB
*   1 - WRITE                                    6.2500 TO 14.0074
**>
                          6.2500 TO 14.0074

NON AGA ZONES
*   1 - WRITE
*   2 - WRITE NON-AGA ZONES (ONLY MANUAL PLACING ALLOWED)
*   3 - WRITE -----------------------------------------------------------
*   4 - UPSTREAM TEST
*   5 - DOWNSTREAM TEST
*   6 - UPSTREAM TEST
**>

NON-AGA ZONES (ONLY MANUAL PLACING ALLOWED)
-------------------------------------------------------------------

UPSTREAM TEST
*   1 - USPTC GT USPTB
    2 - USPTB GT USPTC
    3 - OTHER
**>

USPTC GT USPTB
*   1 - WRITE  13.3962 TO 26.2652
**>
13.3962 TO 26.2652

DOWNSTREAM TEST
*   1 - DSPTC GT DSPTB
    2 - DSPTB GT DSPTC
    3 - OTHER
**>

DSPTC GT DSPTB
*   1 - DSPTF GT DSPTC
    2 - OTHER
**>

DSPTF GT DSPTC
*   1 - WRITE                                   14.0074 TO 17.3125
**>
                          14.0074 TO 17.3125

UPSTREAM TEST
*   1 - USPTF GT USPTE
    2 - OTHER
**>

USPTF GT USPTE
*   1 - WRITE  40.2652 TO 66.3750
**>
40.2652 TO 66.3750

WAIT
*   1 - WAIT
**>

-RETURN- to Continue
  >>

COUPLING PLACEMENT MODE
    1 - AUTOMATIC
```

```
    2 - MANUAL
    3 - NO COUPLINGS
**>1

START
*   1 - DSPTFA.4 = DSPTF - 4
*   2 - COUPLING MAX QTY CALC
*   3 - COUNT
*   4 - PLACE
*   5 - DEGREES
*   6 - NO COUPLING TEST
**>

COUPLING MAX QTY CALC
*   1 - LINE AND NO VANE
    2 - FLANGE VANE
**>

LINE AND NO VANE
*   1 - US TEST
*   2 - DS TEST
**>

US TEST
*   1 - USPTC GT USPTB
    2 - OTHER
**>

USPTC GT USPTB
*   1 - UACPLG.4 = ((USPTC-(USPTB+4))/6)
**>

UACPLG.4 = ((USPTC-(USPTB+4))/6)
    1 - UACPLG LE 0
*   2 - UACPLG LE 1
    3 - UACPLG LE 2
    4 - UACPLG LE 3
    5 - UACPLG LE 4
    6 - UACPLG LE 5
    7 - UACPLG LE 6
    8 - UACPLG GT 6
    9 - OTHER
**>

UACPLG LE 1
*   1 - USAGACPLG.0 = 1
**>

DS TEST
*   1 - DSPTC GT DSPTFA
    2 - DSPTC GT DSPTB
    3 - OTHER
**>

DSPTC GT DSPTFA
*   1 - DACPLG.4 = ((DSPTFA-(DSPTB+4))/6)
**>

DACPLG.4 = ((DSPTFA-(DSPTB+4))/6)
    1 - DACPLG LE 0
*   2 - DACPLG LE 1
    3 - DACPLG LE 2
    4 - DACPLG LE 3
    5 - DACPLG LE 4
    6 - DACPLG LE 5
    7 - DACPLG LE 6
    8 - DACPLG GT 6
    9 - OTHER
**>
```

```
    DACPLG LE 1
*   1 - DSAGACPLG.O = 1
**>

COUNT
*   1 - UCPLG.O[O,USAGACPLG] ENTER # OF U/S COUPLINGS - MAX = 1
*   2 - DCPLG.O[O,DSAGACPLG] ENTER # OF D/S COUPLINGS - MAX = 1
**>
    ENTER # OF U/S COUPLINGS - MAX = 1
 >>1
    ENTER # OF D/S COUPLINGS - MAX = 1
 >>1

UCPLG.O[O,USAGACPLG] ENTER # OF U/S COUPLINGS - MAX = 1
    1 - UCPLG EQ 0
*   2 - UCPLG EQ 1
    3 - UCPLG EQ 2
    4 - UCPLG EQ 3
    5 - UCPLG EQ 4
    6 - UCPLG EQ 5
    7 - UCPLG EQ 6
    8 - OTHER
**>

DCPLG.O[O,DSAGACPLG] ENTER # OF D/S COUPLINGS - MAX = 1
    1 - DCPLG EQ 0
*   2 - DCPLG EQ 1
    3 - DCPLG EQ 2
    4 - DCPLG EQ 3
    5 - DCPLG EQ 4
    6 - DCPLG EQ 5
    7 - DCPLG EQ 6
    8 - OTHER
**>

START
*   1 - UPSTREAM COUPLING
*   2 - DOWNSTREAM COUPLING
**>

UPSTREAM COUPLING
    1 - U/S COUPLING #0
*   2 - U/S COUPLING #1
    3 - U/S COUPLING #2
    4 - U/S COUPLING #3
    5 - U/S COUPLING #4
    6 - U/S COUPLING #5
    7 - U/S COUPLING #6
**>

U/S COUPLING #1
*   1 - COUPLING SELECTOR
*   2 - EQUATE
*   3 - LOCATE
**>

SELECT THE TYPE UPSTREAM COUPLING
*   1 - COUPLING RATING
*   2 - SELECT THE TYPE UPSTREAM COUPLING
**>

COUPLING RATING
*   1 - 3000# (MAX. 900# ANSI)
    2 - 6000#
**>

SELECT THE TYPE UPSTREAM COUPLING
    1 - THREADOLET
    2 - SOCKOLET
```

```
      3 - LATROLET
**>1

THREADOLET
   1 - 1/2" COUPLING
   2 - 3/4" COUPLING
   3 - 1" COUPLING
**>1

1/2" COUPLING
*  1 - THLF3.0 = THLF3 + 1
   2 - THLF6.0 = THLF6 + 1
**>

3000# (MAX. 900# ANSI)
   1 - TV = 'P50704081'
*  2 - TV = 'P50704082'
   3 - TV = 'P50704004'
**>

EQUATE
*  1 - UCPLG1 = TV
**>

LOCATE
*  1 - LOCUCPLG1.4 = USPTB + 4
**>

DOWNSTREAM COUPLING
   1 - D/S COUPLING #0
*  2 - D/S COUPLING #1
   3 - D/S COUPLING #2
   4 - D/S COUPLING #3
   5 - D/S COUPLING #4
   6 - D/S COUPLING #5
   7 - D/S COUPLING #6
**>

D/S COUPLING #1
*  1 - COUPLING SELECTOR
*  2 - EQUATE
*  3 - LOCATE
**>

SELECT THE TYPE DOWNSTREAM COUPLING
*  1 - COUPLING RATING
*  2 - SELECT THE TYPE DOWNSTREAM COUPLING
**>

COUPLING RATING
*  1 - 3000# (MAX 900# ANSI)
   2 - 6000#
**>

SELECT THE TYPE DOWNSTREAM COUPLING
   1 - THREADOLET
   2 - SOCKOLET
   3 - LATROLET
**>2

SOCKOLET
   1 - 1/2" COUPLING
   2 - 3/4" COUPLING
   3 - 1" COUPLING
**>2

3/4" COUPLING
*  1 - SQTR3.0 = SQTR3 + 1
   2 - SQTR6.0 = SQTR6 + 1
**>
```

```
      3000# (MAX 900# ANSI)
      1 - TV = 'P2 3000#3/4"SCKLT'
*     2 - TV = 'P3-4 3000#3/4"SCKLT'
      3 - TV = 'P6-12 3000#3/4"SCKLT'
**>

EQUATE
*  1 - DCPLG1 = TV
**>

LOCATE
*  1 - LOCDCPLG1.4 = DSPTB + 4
**>

DEGREES
*   1 - DEGU1.0 = 0
*   2 - DEGU2.0 = 0
*   3 - DEGU3.0 = 0
*   4 - DEGU4.0 = 0
*   5 - DEGU5.0 = 0
*   6 - DEGU6.0 = 0
*   7 - DEGD1.0 = 0
*   8 - DEGD2.0 = 0
*   9 - DEGD3.0 = 0
*  10 - DEGD4.0 = 0
*  11 - DEGD5.0 = 0
*  12 - DEGD6.0 = 0
**>

NO COUPLING TEST
   1 - NO COUPLINGS
*  2 - YES COUPLINGS
**>

START
*   1 - MESSAGE
*   2 - TYPE
*   3 - SIZE
*   4 - PRESSURE
*   5 - BORE
*   6 - STYLE
*   7 - TRIM
*   8 - PIPE WRITER
*   9 - END CONNECTION WRITER
*  10 - FIGURE/BETA/VANE
*  11 - LENGTH WRITER
*  12 - COUPLING WRITER
*  13 - WAITER
*  14 - SELECT
*  15 - WARNING SCREEN
*  16 - LOCATION SCREEN
**>

MESSAGE
*  1 - DUMP
*  2 - MESSAGE
**>

DUMP
   1 - 200
*  2 - NOPLOT
**>

MESSAGE
*  1 - CLEAR
*  2 - WRITE THESE ARE YOUR SELECTIONS
*  3 - WRITE ===================================================================
**>
THESE ARE YOUR SELECTIONS
========================================================================
```

```
     TYPE
*  1 - WRITE SENIOR
   2 - WRITE JUNIOR
   3 - WRITE SIMPLEX
   4 - WRITE ORIFICE FLANGE UNION
**>
SENIOR

SIZE
   1 - WRITE NOMINAL SIZE = 2"
   2 - WRITE NOMINAL SIZE = 3"
*  3 - WRITE NOMINAL SIZE = 4"
   4 - WRITE NOMINAL SIZE = 6"
   5 - WRITE NOMINAL SIZE = 8"
   6 - WRITE NOMINAL SIZE = 10"
   7 - WRITE NOMINAL SIZE = 12"
**>
NOMINAL SIZE = 4"

PRESSURE
   1 - WRITE PRESSURE = 150 PSI
   2 - WRITE PRESSURE = 300 PSI
*  3 - WRITE PRESSURE = 600 PSI
   4 - WRITE PRESSURE = 900 PSI
   5 - WRITE PRESSURE = 1500 PSI
**>
PRESSURE = 600 PSI

BORE
   1 - WRITE SCHEDULE 20 = 3.8260
   2 - WRITE SCHEDULE 30 = 3.8260
   3 - WRITE SCHEDULE STANDARD = 3.8260
   4 - WRITE SCHEDULE 40 = 3.8260
   5 - WRITE SCHEDULE 60 = 3.8260
   6 - WRITE SCHEDULE XH = 3.8260
*  7 - WRITE SCHEDULE 80 = 3.8260
   8 - WRITE SCHEDULE 100 = 3.8260
   9 - WRITE SCHEDULE 120 = 3.8260
  10 - WRITE SCHEDULE 140 = 3.8260
  11 - WRITE SCHEDULE 160 = 3.8260
  12 - WRITE SCHEDULE XXH = 3.8260
**>
SCHEDULE 80 = 3.8260

STYLE
   1 - WRITE RAISED FACE FLANGED
   2 - WRITE RAISED FACE FLANGED - 125 RMS FLANGE FACE FINISH
*  3 - WRITE RAISED FACE FLANGNEK
   4 - WRITE RAISED FACE FLANGNEK - 125 RMS FLANGE FACE FINISH
   5 - WRITE RING TYPE JOINT FLANGED (RTJFL)
   6 - WRITE RING TYPE JOINT FLANGNEK (RTJFN)
   7 - WRITE WELDNEK
   8 - WRITE CORNER TAP RAISED FACE WELDNECK
   9 - WRITE RAISED FACE WELDNECK
  10 - WRITE RING TYPE JOINT
  11 - WRITE RAISED FACE SLIP-ON
  12 - WRITE 125RMS RAISED FACE WELDNECK
**>
RAISED FACE FLANGNEK

TRIM
*  1 - WRITE STANDARD TRIM
   2 - WRITE SOUR GAS TRIM (AASG)
**>
STANDARD TRIM

PIPE WRITER
*  1 - WRITE DOMESTIC PIPE
   2 - WRITE JAPANESE PIPE
```

```
      3 - WRITE HONED PIPE
  **>
DOMESTIC PIPE

END CONNECTION WRITER
  *  1 - WRITE RAISED FACE FLANGED TUBE ENDS
     2 - WRITE 125RMS RAISED FACE FLANGED TUBE ENDS
     3 - WRITE RAISED FACE SLIP-ON FLANGED TUBE ENDS
     4 - WRITE RING TYPE JOINT FLANGED TUBE ENDS
     5 - WRITE BUTT WELD TUBE ENDS
  **>
RAISED FACE FLANGED TUBE ENDS

FIGURE/BETA/VANE
  *  1 - BETA
  *  2 - FIGURE
  *  3 - VANE WRITER
  **>

BETA
     1 - WRITE DANIEL CATALOG STD .75 BETA
  *  2 - WRITE BETA =  .6500
  **>
BETA =  .6500

FIGURE
     1 - WRITE AGA FIG 4 (DANIEL FIG 6)
  *  2 - WRITE AGA FIG 5 (DANIEL FIG 4)
     3 - WRITE AGA FIG 6 (DANIEL FIG 3)
     4 - WRITE AGA FIG 7 (DANIEL FIG 2)
     5 - WRITE AGA FIG 8 (DANIEL FIG 5)
  **>
AGA FIG 5 (DANIEL FIG 4)

VANE WRITER
  *  1 - WRITE LINE VANE
     2 - WRITE FLANGED VANE
     3 - NOVANE
  **>
LINE VANE

LENGTH WRITER
  *  1 - WRITE U/S TUBE LENGTH =  75.0000    AGAMIN =  48.2076
  *  2 - WRITE D/S TUBE LENGTH =  30.0000    AGAMIN =  15.9926
  **>
U/S TUBE LENGTH =  75.0000    AGAMIN =  48.2076
D/S TUBE LENGTH =  30.0000    AGAMIN =  15.9926

COUPLING WRITER
  *  1 - COUPLING MODE
  *  2 - WRITE 1       U/S COUPLINGS // 1       D/S COUPLINGS
  **>
1       U/S COUPLINGS // 1       D/S COUPLINGS

COUPLING MODE
  *  1 - WRITE AUTOMATIC COUPLING LOCATOR
     2 - WRITE MANUAL COUPLING LOCATOR
     3 - NO COUPLINGS
  **>
AUTOMATIC COUPLING LOCATOR

WAITER
  *  1 - WAIT
  *  2 - CLEAR SCREEN
  **>

-RETURN- to Continue
  >>
```

```
     SELECT
 *    1 - WRITE  PART NAME   UM   QTY   PART NO.             U/S LG    D/S LG
 *    2 - WRITE                                              (INCHES)  (INCHES)
 *    3 - WRITE  ================================================================
 *    4 - FITTING
 *    5 - COMPANION FLANGE
 *    6 - PIPE
 *    7 - ENDCONN
 *    8 - VANE
 *    9 - COUPLING QTY WRITER
 *   10 - WAIT
 **>
PART NAME   UM   QTY   PART NO.              U/S LG    D/S LG
                                             (INCHES)  (INCHES)
================================================================

FITTING
 *    1 - WRITE SENIOR      EA   1.0000  P20119032      6.6250    6.6250
      2 - WRITE JUNIOR      EA   1.0000  &JR            &USFTG    &DSFTG
      3 - WRITE SIMPLEX     EA   1.0000  &SX            &USFTG    &DSFTG
      4 - WRITE OFU         EA   1.0000  &OFU           &USFTG    &DSFTG
 **>
SENIOR         EA   1.0000  P20119032        6.6250    6.6250

COMPANION FLANGE
      1 - WRITE CMPN FL KIT EA   1.0000  P01213070      4.0000    4.0000
 *    2 - WRITE CMPN FL KIT EA   1.0000  P01213070                4.0000
      3 - NO COMPANION FLG
 **>
CMPN FL KIT    EA   1.0000  P01213070                  4.0000

WRITE CMPN FL KIT EA   1.0000  P01213070                    4.0000
 *    1 - WRITE  (GASKET)                                         .0625
 **>
  (GASKET)                                                        .0625

PIPE
      1 - WRITE HONED PIPE  FT   6.5989  P60302720     64.1250   15.0625
      2 - WRITE JAPAN PIPE  FT   6.5989  P60302720     64.1250   15.0625
 *    3 - WRITE DOMES PIPE  FT   6.5989  P60302720     64.1250   15.0625
 **>
DOMES PIPE     FT   6.5989  P60302720       64.1250   15.0625

ENDCONN
 *    1 - WRITE RF END CONN EA   2.0000  P32102502      4.2500    4.2500
      2 - WRITE 125R RF END EA   2.0000  P32102502      4.2500    4.2500
      3 - WRITE RTJ END     EA   2.0000  P32102502      4.2500    4.2500
      4 - WRITE RFSO END    EA   2.0000  P32102502      4.2500    4.2500
      5 - BUTT ENDS
 **>
RF END CONN   EA   2.0000  P32102502         4.2500    4.2500

VANE
 *    1 - VANE
      2 - NOVANE
      3 - WRITE VANE        EA   1.0000  P21403026
 **>

VANE
 *    1 - WRITE VANE        EA   1.0000  P21403026
 *    2 - WRITE -SET SCREW  EA   1.0000  P56052170
 *    3 - WRITE -THREADOLET EA   1.0000  P50704082
 *    4 - WRITE -PIPE PLUG  EA   1.0000  P50701103
 **>
VANE          EA   1.0000  P21403026
-SET SCREW    EA   1.0000  P56052170
-THREADOLET   EA   1.0000  P50704082
-PIPE PLUG    EA   1.0000  P50701103
```

```
   COUPLING QTY WRITER
   1 - NO COUPLINGS
*  2 - YES COUPLINGS
**>

COUPLING QTY WRITER
*  1 - THREADOLET 1/2"
   2 - THREADOLET 3/4"
   3 - THREADOLET 1"
   4 - SOCKOLET 1/2"
*  5 - SOCKOLET 3/4"
   6 - SOCKOLET 1"
   7 - LATROLET 1/2"
   8 - LATROLET 3/4"
   9 - LATROLET 1"
**>

THREADOLET 1/2"
*  1 - 3000#
   2 - 6000#
**>

3000#
   1 - WRITE 1/2"3000THD EA    1    P50704081
*  2 - WRITE 1/2"3000THD EA    1    P50704082
   3 - WRITE 1/2"3000THD EA    1    P50704004
**>
1/2"3000THD EA    1    P50704082

SOCKOLET 3/4"
*  1 - 3000#
   2 - 6000#
**>

3000#
   1 - WRITE 3/4"3000SCK EA    1    P2 3000#3/4"SCKLT
*  2 - WRITE 3/4"3000SCK EA    1    P3-4 3000#3/4"SCKLT
   3 - WRITE 3/4"3000SCK EA    1    P6-12 3000#3/4"SCKLT
**>
3/4"3000SCK EA    1    P3-4 3000#3/4"SCKLT

WAIT
*  1 - WAIT
**>

-RETURN- to Continue
 >>

START
*  1 - U/S AGA TEST
*  2 - D/S AGA TEST
*  3 - VANE LOCATION AGA TEST
*  4 - COUPLING LOCATION AGA TEST
*  5 - D/S INTERFERENCE TEST
*  6 - D/S INTERFERENCE TEST
*  7 - SKIP WARNING SCREEN
**>

U/S AGA TEST
   1 - USLG LT AGAUS
*  2 - OTHER
**>

D/S AGA TEST
   1 - DSLG LT AGADS
*  2 - OTHER
**>

VANE LOCATION AGA TEST
*  1 - LINE VANE
```

```
    2 - FLANGE VANE
    3 - NOVANE
**>

COUPLING LOCATION AGA TEST
*   1 - USCPLG
*   2 - DSCPLG
**>

USCPLG
*   1 - UCPLG GT 0.0
    2 - OTHER
**>

UCPLG GT 0.0
*   1 - U/S CPLG1 TEST
    2 - U/S CPLG2 TEST
    3 - U/S CPLG3 TEST
    4 - U/S CPLG4 TEST
    5 - U/S CPLG5 TEST
    6 - U/S CPLG6 TEST
**>

U/S CPLG1 TEST
    1 - LOCUCPLG1 GT USPTC
*   2 - OTHER
**>

DSCPLG
*   1 - DCPLG GT 0.0
    2 - OTHER
**>

DCPLG GT 0.0
*   1 - D/S CPLG1 TEST
    2 - D/S CPLG2 TEST
    3 - D/S CPLG3 TEST
    4 - D/S CPLG4 TEST
    5 - D/S CPLG5 TEST
    6 - D/S CPLG6 TEST
**>

U/S CPLG1 TEST
    1 - LOCDCPLG1 GT DSPTC
*   2 - OTHER
**>

D/S INTERFERENCE TEST
    1 - DSPIPE LT 4
*   2 - OTHER
**>

D/S INTERFERENCE TEST
    1 - DSPIPE LT 0
*   2 - OTHER
**>

SKIP WARNING SCREEN
    1 - WAIT
*   2 - CONTINUE
**>

NOVANES AND NO COUPLINGS
    1 - NOVANES AND NO COUPLINGS
*   2 - START
**>

START
*   1 - WRITE    DESC         LOCATION    DEG   PART#
*   2 - WRITE ------------------------------------------
```

```
     *   3 - VANE
     *   4 - CPLG
     *   5 - WAIT
     **>
        DESC            LOCATION      DEG     PART#
     ----------------------------------------------------------

VANE
     *   1 - WRITE LVANE CPLG#1   48.3598           0 P50704082
         2 - FLVANE
         3 - NOVANE
     **>
     LVANE CPLG#1       48.3598           0 P50704082

VANE
         1 - WRITE LVANE CPLG#2    &LVLOC2         0      &THDLT
     *   2 - WRITE LVANE CPLG#2    &LVLOC2         0      &THDLT
     **>

CPLG
         1 - NO COUPLINGS
     *   2 - YES COUPLINGS
     **>

YES COUPLINGS
     *   1 - WRITE U/S COUPLING #1 10.2500         0 P50704082
         2 - WRITE U/S COUPLING #2 &LOCUCPLG2      &DEGU2   &UCPLG2
         3 - WRITE U/S COUPLING #3 &LOCUCPLG3      &DEGU3   &UCPLG3
         4 - WRITE U/S COUPLING #4 &LOCUCPLG4      &DEGU4   &UCPLG4
         5 - WRITE U/S COUPLING #5 &LOCUCPLG5      &DEGU5   &UCPLG5
         6 - WRITE U/S COUPLING #6 &LOCUCPLG6      &DEGU6   &UCPLG6
     *   7 - WRITE D/S COUPLING #1 10.2500         0 P3-4 3000#3/4"SCKLT
         8 - WRITE D/S COUPLING #2 &LOCDCPLG2      &DEGD2   &DCPLG2
         9 - WRITE D/S COUPLING #3 &LOCDCPLG3      &DEGD3   &DCPLG3
        10 - WRITE D/S COUPLING #4 &LOCDCPLG4      &DEGD4   &DCPLG4
        11 - WRITE D/S COUPLING #5 &LOCDCPLG5      &DEGD5   &DCPLG5
        12 - NOVANES AND NO COUPLINGS
     **>
     U/S COUPLING #1 10.2500        0 P50704082
     D/S COUPLING #1 10.2500        0 P3-4 3000#3/4"SCKLT

WAIT
     *   1 - WAIT
     **>

-RETURN- to Continue
     >>

METER TUBE EXPERT SYSTEM

DANIEL INDUSTRIES

WRITTEN BY BUFORD B. WILSON

CHOOSE OPTION:
     1 - METER TUBE
     2 - EXIT
     >>
```

What is claimed is:

1. A data entry system for the design, engineering or manufacture of meter tubes by a user of the system comprising a computer having memory, a database of design criteria in operative association with said computer, communicating means for providing an interface between the user and said computer such that user selections are made based upon prior constraints required by the design criteria in said database, where the user is prompted to select meter tubes available pursuant to the available design criteria in said database, further the user is prompted with user selection criteria, display means for illustrating the proposed meter tube according to the user selection criteria, a database of meter tube parts in operative association with said computer such that said computer calculates the available coupling zones based upon the communication between said database of design criteria and said database of meter tube parts as required by the specific responses of the user through said communicating means such that the user selects the desired location of the coupling zones whereby the final meter tube embodiment is communicated to said display means for final approval by the user or additional modification using said communicating means.

* * * * *